United States Patent [19]
Sun et al.

[11] Patent Number: 6,100,351
[45] Date of Patent: Aug. 8, 2000

[54] OLEFIN POLYMERIZATION PROCESS AND PRODUCTS THEREOF

[75] Inventors: Lixin Sun; George C. Allen; Michael P. Hughes, all of Odessa, Tex.

[73] Assignee: Huntsman Polymers Corporation, Salt Lake City, Utah

[21] Appl. No.: 08/878,129

[22] Filed: Jun. 18, 1997

Related U.S. Application Data

[63] Continuation-in-part of application No. 08/779,762, Jan. 7, 1997, Pat. No. 5,948,720.

[51] Int. Cl.$^7$ .................................. C08F 4/44; C08F 4/64
[52] U.S. Cl. ...................... 526/125.3; 526/128; 526/141; 502/105
[58] Field of Search ............................. 526/125, 88, 351, 526/125.3, 128, 141; 252/442; 525/240; 502/127, 111, 125, 105; 264/331.15

[56] References Cited

U.S. PATENT DOCUMENTS

| | | | |
|---|---|---|---|
| 3,032,511 | 5/1962 | Langer et al. | 252/429 |
| 3,112,300 | 11/1963 | Natta et al. | 260/93.7 |
| 3,112,301 | 11/1963 | Natta et al. | 260/93.7 |
| 3,128,252 | 4/1964 | Tornqvist et al. | 252/429 |
| 3,252,960 | 5/1966 | Tornqvist et al. | 260/93.7 |
| 3,926,848 | 12/1975 | Wristers et al. | 252/442 |
| 4,335,225 | 6/1982 | Collette et al. | 525/240 |
| 4,347,158 | 8/1982 | Kaus et al. | 252/429 B |
| 4,525,555 | 6/1985 | Tajima et al. | 526/125 |
| 4,547,476 | 10/1985 | Terano et al. | 502/127 |
| 4,736,002 | 4/1988 | Allen et al. | 526/125 |
| 4,829,037 | 5/1989 | Terano et al. | 502/112 |
| 4,839,321 | 6/1989 | Murai et al. | 502/127 |
| 4,847,227 | 7/1989 | Murai et al. | 502/127 |
| 4,970,186 | 11/1990 | Terano et al. | 502/125 |
| 4,990,477 | 2/1991 | Kioka et al. | 502/107 |
| 5,066,737 | 11/1991 | Job | 526/119 |
| 5,077,357 | 12/1991 | Job | 526/119 |
| 5,082,907 | 1/1992 | Job | 526/119 |
| 5,089,573 | 2/1992 | Job | 526/124 |
| 5,106,806 | 4/1992 | Job | 502/111 |
| 5,118,649 | 6/1992 | Job | 502/124 |
| 5,118,767 | 6/1992 | Job | 526/124 |
| 5,118,768 | 6/1992 | Job et al. | 526/124 |
| 5,122,494 | 6/1992 | Job | 502/125 |
| 5,124,298 | 6/1992 | Job | 502/127 |
| 5,130,284 | 7/1992 | Terano et al. | 502/125 |
| 5,153,158 | 10/1992 | Kioka et al. | 502/126 |
| 5,164,352 | 11/1992 | Job et al. | 502/124 |
| 5,182,245 | 1/1993 | Arzoumanidis et al. | 502/115 |
| 5,218,052 | 6/1993 | Cohen et al. | 525/240 |
| 5,294,581 | 3/1994 | Job | 502/124 |
| 5,331,054 | 7/1994 | Fujita et al. | 525/240 |
| 5,358,994 | 10/1994 | Mallow | 524/495 |
| 5,382,630 | 1/1995 | Stehling et al. | 525/240 |
| 5,382,631 | 1/1995 | Stehling et al. | 525/240 |
| 5,414,063 | 5/1995 | Seeger et al. | 526/88 |
| 5,438,110 | 8/1995 | Ishimaru et al. | 526/125 |
| 5,476,911 | 12/1995 | Morini et al. | 526/124.6 |
| 5,539,056 | 7/1996 | Yang et al. | 525/240 |
| 5,596,052 | 1/1997 | Resconi et al. | 526/127 |
| 5,610,246 | 3/1997 | Buehler et al. | 526/119 |

FOREIGN PATENT DOCUMENTS

| | | |
|---|---|---|
| 0 658 577 B1 | 6/1995 | European Pat. Off. |
| 3 334 559 | 4/1984 | Germany. |
| 2 130 225 | 5/1984 | United Kingdom. |

OTHER PUBLICATIONS

Journal of Molecular Catalysis, 90 (1994), 201–211.
Journal of Organometalic Chemistry, 369 (1989) 359–370.
"REXflex® Flexible Polyolefins," Rexene Corporation, Nov., 1996.
L.M. Sherman, "Take A Look At PP Now," Plastics Technology, Jan., 1996, pp. 38–41.
"FEXflex™ FPO, " Rexene Corporation, 1994.

*Primary Examiner*—David W. Wu
*Assistant Examiner*—Tatyana Zalukaeva
*Attorney, Agent, or Firm*—Pennie & Edmonds, LLP

[57] ABSTRACT

Methods of producing polyolefin polymers by polymerizing an α-olefin in the presence of a catalyst including a pro-catalyst having a magnesium halide, an aluminum halide, a tetravalent titanium halide, an electron donor, and a silane having the formula $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl, and a co-catalyst comprising an organometallic compound, or reaction products of the pro-catalyst and the co-catalyst, wherein the electron donor is present in an amount sufficient to reduce the stickiness of the resultant polyolefin polymers. Moreover, the polymers produced thereby, and methods of preparing resultant products from the polymers are part of the present invention.

25 Claims, No Drawings

OLEFIN POLYMERIZATION PROCESS AND PRODUCTS THEREOF

CROSS REFERENCE TO RELATED APPLICATION

This application is a continuation-in-part of application Ser. No. 08/779,762, filed Jan. 7, 1997, now allowed U.S. Pat. No. 5,948,720.

TECHNICAL FIELD

This invention relates to a high-molecular weight average, polyolefin polymer having a heat of fusion of about 0.4 J/g to 75 J/g, a polydispersity index of less than about 10, and a melt flow rate of between about 0.3 g/10 min. to about 30 g/10 min. at 230° C., having a reduced stickiness, as well as methods of producing such polyolefin polymers and products using the same by polymerizing an α-olefin in the presence of a catalyst.

BACKGROUND OF THE INVENTION

It is well known that crystalline polypropylene generally has an isotactic or syndiotactic structure and that amorphous polypropylene generally has considerable atactic structure. U.S. Pat. Nos. 3,112,300 and 3,112,301, for example, describe isotactic polypropylene and provide structural formulae for isotactic and syndiotactic polypropylene. The former is a straight chain of propylene units wherein the methyl groups are all aligned on one side of the polymer chain. In the latter, the methyl groups alternate from one side of the chain to the other. In these polypropylenes, the regularity of structure tends to result in a more highly crystalline material. Historically, atactic polypropylene polymers have a low MW, typically resulting in gummy materials of minimal tensile strength.

High-molecular-weight amorphous poly alpha-olefins ("APAO"), such as amorphous propylene homo- and co-polymers, are important for their use in diverse products. The broad utility of these materials is due in large part to the unique combination of chemical and physical properties, such as chemical inertness, softness, flexibility, etc., exhibited by these materials. Amorphous polypropylene is different from crystalline polypropylenes in steric microstructure.

Almost all of the polypropylene which is used commercially is crystalline isotactic polypropylene. Conventional polymers of this type typically have a crystallinity, or heat of fusion, of 70 J/g or higher, and more typically 90 J/g or higher. These products are well known and have been the subject of many patents and articles.

The below-mentioned patents disclose one type of catalyst used in the formation of such polymers, which includes a pro-catalyst that is typically formed from the reaction product of a magnesium alkoxide compound, preferably one of the formula $MgR_1R_2$, where $R_1$ is an alkoxy or aryl oxide group and $R_2$ is an alkoxide or an aryl oxide group or halogen, and a tetravalent titanium halide wherein the reaction takes place in the presence of an electron donor and, preferably, a halogenated hydrocarbon.

U.S. Pat. No. 5,118,768 discloses a process for the production of elastomeric, primarily isotactic polyolefins by polymerizing olefins in the presence of a catalyst which includes: (a) the reaction product of a magnesium alkoxide having a formula of $MgR_1R_2$, where $R_1$ is an alkoxy or aryl oxide group and $R_2$ is an alkoxide or an aryl oxide group or halogen and a tetravalent titanium halide and wherein the reaction takes place in the presence of an electron donor that is an effectively hindered heterocyclic aromatic nitrogen compound, and (b) an organoaluminum compound. A variety of electron donors are disclosed, including 2,6-lutidine and 6-chloro-2-picoline. U.S. Pat. No. 5,164,352 has an identical disclosure, but it is directed to the catalyst used in the polymerization of these polyolefins. Both references disclose that the catalyst production occurs in a liquid reaction medium, which must be followed by elaborate steps to suitably isolate the catalyst from the reaction solvent(s). The polymerization reaction also occurs in the liquid phase at a temperature of 50° C. to 80° C. and a pressure sufficient to maintain liquid conditions.

U.S. Pat. Nos. 5,089,573, 5,118,649, 5,118,767, and 5,294,581, all similarly require magnesium alkoxide and/or magnesium aryl oxide. These references are substantially similar to U.S. Pat. Nos. 5,118,768 and 5,164,352.

U.S. Pat. Nos. 5,438,110 and 4,990,479 disclose a polymerization process that involves polymerizing or copolymerizing olefins in the presence of an olefin polymerization catalyst formed from: (A) a solid titanium component which contains magnesium, titanium, halogen and an electron donor as the essential components, where the magnesium compound or magnesium compound with the electron donor is reacted with titanium in the liquid phase, (B) an organoaluminum compound, and (C) an organosilicon compound represented by the formula $SiR^{21}R^{22}_m(OR^{23})_{3-m}$, where $R^{21}$ is a cyclopentyl group, a substituted cyclopentyl group, or one of several other ringed structures.

U.S. Pat. No. 5,218,052 discloses a method for making a homopolymer of propylene having increased stiffness and a broadened, molecular weight distribution by polymerizing propylene in a high activity catalyst system and a silane in at least two stages. That system includes: (a) a silane of formula $R_1(R_2)_xSi(OR_4)_y(OR_5)_z$; (b) a titanium-containing compound supported on a magnesium-containing compound; and (c) a co-catalyst comprising a Group II or III metal alkyl. Lutidine is disclosed among a vast genus of possible electron donors.

U.S. Pat. No. 5,182,245 discloses a solid, hydrocarbon-insoluble catalyst or catalyst component for the polymerization of alpha-olefins in the slurry phase, from a product produced by: (A) forming a solution of magnesium-containing species in a liquid, (B) precipitating solid particles from the solution by treatment with a transition metal halide in the presence of at least one of a tetrabutoxysilane and a tetrabutoxytitanate; and (C) treating the particles with a transition metal compound and an electron donor. Lutidine is disclosed as a possible electron donor among a vast genus of possible electron donors.

U.S. Pat. No. 5,153,158 discloses: (I) an olefin polymerization catalyst formed by prepolymerization of olefin and an olefin polymerization catalyst of a solid titanium catalyst component (A) having magnesium, titanium, and halogen as essential ingredients, along with (B) a Group I or III metal organometallic compound and (C) an electron donor selected from diethers and organosilicons represented by $R_nSi(OR')_{4-n}$, and being suspended in a liquid alpha-olefin, and (II) a metal organometallic compound of a Group I or III metal. The $R_1$ group is disclosed in the specification to be one of various cyclopentyl or substituted cyclopentyl groups. U.S. Pat. No. 4,990,477 is essentially cumulative, except that it discloses that the optional electron donor may instead be an organic carboxylic acid.

European Patent 475,307 discloses an elastomeric high molecular weight substantially amorphous propylene homopolymer having a melting point between about 145° C.

and 165° C., a melt viscosity at 190° C. of greater than 200,000 cPs, a heat of fusion of about 16.7 J/g to 41.8 J/g, having about a 35% to 55% diethyl ether soluble fraction, which fraction has inherent viscosity less than about 1.0 dl/g and is substantially free of isotactic crystallinity.

Amorphous polypropylenes, which have very little strength, are used commercially in adhesives and asphalt additives, for example. Conventional amorphous polypropylenes that tend to have a crystallinity lower than 65 J/g typically have an extremely high melt flow rate of around 10,000 g/10 min. (at 230° C.). Generally, these amorphous polypropylene polyolefins are sticky, which limits their possible usage in commercial products. Conventional heterogeneous Ziegler-Natta catalysts, such as those disclosed in U.S. Pat. No. 4,347,158, for example, tend to produce tacky polymers that have a broad range of molecular weights and tacticities. It would be advantageous to reduce this stickiness in the polyolefins and to produce polyolefins having a low degree of crystallinity and a lower melt flow rate, thereby creating a class of polymers having a variety of new uses.

It is thus desired to produce higher molecular weight FPO polymers that have a low crystallinity, low solubility in methylethyl ketone, and a low melt flow rate ("MFR").

SUMMARY OF THE INVENTION

The present invention relates to a method of preparing polyolefin polymers by polymerizing an α-olefin monomeric raw material in the presence of a catalyst having a pro-catalyst of a magnesium halide, an aluminum halide, a tetravalent titanium halide, an electron donor, and a silane having the formula $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl, and a co-catalyst comprising an organometallic compound, or reaction products of the pro-catalyst and the co-catalyst, wherein the electron donor is present in an amount sufficient to reduce the stickiness of the resultant flexible polyolefin polymers.

In another embodiment, the method further includes selecting the monomeric raw material to be a plurality of alpha-olefin monomers. In another embodiment, the method further includes selecting the plurality of alpha-olefin monomers to be monomers of propylene, ethylene, butene, pentene, octene, or mixtures thereof. In yet another embodiment, the method further includes selecting the plurality of alpha-olefin monomers to be propylene and at least one additional monomer having between about 2 to 12 carbon atoms per molecule. In a preferred embodiment, the additional monomer is selected to be at least one of ethylene, 1-butene, 1-pentene or 1-octene.

In one embodiment, ethylene is provided in the monomeric raw material in an amount of about 1 to 40 weight percent. In another embodiment, ethylene is provided in the monomeric raw material in an amount of about 1 to 20 weight percent.

In one embodiment, hydrogen is added to the polymerization in an amount of less than about 10 weight percent. In another embodiment, the organometallic compound is selected to be a metal alkane. In a preferred embodiment, the organometallic compound is selected to be an aluminum alkane.

In another embodiment, an external modifier is added to the catalyst in an amount sufficient to increase the crystallinity of the polyolefin polymers to a desired level of between about 15 J/g to 60 J/g. In another embodiment, the desired level is between about 4.6 J/g to 35 J/g. In a preferred embodiment, the external modifier is selected to be a silane component, selecting the desired level of crystallinity to be about 25 J/g to 55 J/g, and selecting the polyolefin polymer to have a melt flow rate of between about 0.3 to 30 g/10 min. at 230° C.

In another embodiment, ethylene is provided in an effective amount to preclude substantial modification by the external modifier of at least one physical property of the polymer. In a preferred embodiment, the physical property is selected to include crystallinity of propylene domains in the polymer.

In yet another embodiment, the melt flow rate of the polyolefin polymer is selected to be between about 0.4 J/g to 60 g/10 min. In a more preferred embodiment, the melt flow rate is about 0.4 J/g to 15 J/g. In another embodiment, the stickiness is reduced to a sufficiently low level so that only between about 1 to 12 weight percent of the polyolefin polymer is soluble in methylethyl ketone. In a preferred embodiment, the stickiness is reduced to a sufficiently low level so that only between about 1 to 5 weight percent of the polyolefin polymer is soluble in methylethyl ketone.

In another embodiment, sufficient polymerization conditions are selected to include a feed of a plurality of monomers having at least about 70 weight percent propylene, a temperature of about 130° F. to 175° F., and a reactor pressure sufficient to maintain the propylene in a liquid phase.

In another embodiment, the silane is selected to have $R_1$ as a $C_{5-12}$cycloalkyl, $R_2$ as $C_{1-6}$alkyl, and $R_3$ and $R_4$ each as a $C_{1-6}$alkyl. In a preferred embodiment, the silane is selected to have $R_1$ as cyclohexyl, and $R_2$, $R_3$ and $R_4$ each as methyl. In another embodiment, the external modifier is selected to be a silane having the formula $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl. In both embodiments, the preferred aryl is a $C_{6-22}$aryl.

In yet another embodiment, the invention includes forming a molded product from the polymer. In a preferred embodiment, the molded product is formed by injection molding or blow molding. In another embodiment, the invention includes forming a film having a thickness between about 0.5 mils to 10 mils from the polymer.

The invention also relates to a polyolefin polymer produced by the process described above. Additionally, the invention relates to a high-molecular weight average, polyolefin polymer having a heat of fusion of about 0.4 J/g to 75 J/g, a polydispersity index of less than about 10, and a melt flow rate of between about 0.3 g/10 min. to about 30 g/10 min. at 230° C., having a reduced stickiness.

In one embodiment, the only about 1 to 12 weight percent of the polyolefin polymer is soluble in a methylethyl ketone solution. In a preferred embodiment, only about 1 to 5 weight percent of the polyolefin polymer is soluble in methylethyl ketone.

In another embodiment, the polymer is a homopolymer of propylene. In a preferred embodiment, the polymer is a copolymer of propylene and at least one of ethylene, 1-butene, 1-pentene, and 1-octene. In another embodiment, the heat of fusion is between about 4.6 J/g to 35 J/g. In a more preferred embodiment, the heat of fusion is between about 15 J/g to 60 J/g. In another embodiment, the melt flow rate is between about 0.4 g/10 min. to 15 g/10 min. In a preferred embodiment, the melt flow rate is between about 0.5 g/10 min. to 7 g/10 min. In yet another embodiment, the polydispersity index of the polymer is less than about 8. In another embodiment, the polymer has a melt swell ratio of about 1.6 or less. In a preferred embodiment, the melt swell ratio is about 1.4 or less. In another embodiment, the polymer is formed to substantially maintain the same physical shape during steam autoclaving at a temperature of at least 100° C. and at a pressure of at least atmospheric pressure.

The invention also relates to a method of preparing polyolefin polymers by preparing a pro-catalyst by mixing a magnesium halide, an aluminum halide, a silane having the formula $R_1R_2Si(OR_3)(OR_4)$, an electron donor, and a tetravalent titanium halide to form a first mixture, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are each an H, $C_{1-6}$alkyl, or a mono- or di-substituted $C_{1-6}$alkyl, adding a co-catalyst comprising an organometallic compound to the pro-catalyst to prepare a catalyst, contacting a monomeric raw material and the catalyst under conditions sufficient to cause polymerization of the raw material to produce a polymerization product containing polyolefin polymers, wherein the catalyst reduces the stickiness of the resultant polyolefin polymers, and recovering polyolefin polymers from the polymerization product.

DETAILED DESCRIPTION OF THE INVENTION

It has now been discovered that flexible polyolefins ("FPO"), a new class of polymers having a controllable degree of crystallinity lower than that found in commercial isotactic polypropylene, may be advantageously produced using a newly discovered catalyst as described herein. This class of polymers has various applications because of enhanced properties compared to purely amorphous polypropylenes. It is believed that low molecular weight, stereo- and regio-irregular polypropylene having atactic characteristics can be responsible for the highly sticky FPO ("flexible polyolefin") polymers obtained with conventional catalysts. Such sticky material creates a variety of handling and processing difficulties.

An improved catalyst for the production of these flexible polyolefins has now been discovered, which reduces stickiness of the resultant FPO polymers that are produced. The prior art catalyst typically included a pro-catalyst made of a magnesium halide, aluminum halide, and a titanium halide. The present invention adds a silane component, such as cyclohexylmethyldimethoxysilane. Although the inventors do not wish to be bound by any particular theory, this is believed to increase the surface area and pore volume of the magnesium halide and aluminum halide mixture, and uses one of a limited number of specific nitrogen-based donors. The Lewis acidic centers are believed to be coordinatively highly unsaturated, sterically accessible, non-chiral and non-stereospecific, thereby producing low molecular weight, atactic polymers. The surface tension of polymers increases with molecular weight and tacticity, yet the surface free energy can be reduced when the surface is covered by a layer of low molecular weight atactic polymers. Thus, the driving force in Ziegler-Natta ("Z-N") polymers permits the low molecular weight polymers to concentrate on the surface and impart stickiness. It is believed that the addition of the silane component alters the nature of the magnesium and aluminum halide components by increasing the surface area and pore volume to provide more interstitial space in the magnesium and aluminum halide components for the titanium halide to reside when it is added. A weak base, or nitrogen-based donor, and titanium halide are then added to the mixture before ball milling to form the catalyst. The base is believed to advantageously complex to a portion of titanium sites, thus rendering them unable to produce low molecular weight polymers that typically cause stickiness in flexible polyolefin polymers. By decreasing the formation of lower molecular weight FPO polymers, which are more sticky than higher molecular weight FPO polymers, and by narrowing the band of molecular weights of the polymer product, an improved polyolefin may be produced having reduced stickiness and improved processing characteristics.

The improved FPO polymers of the present invention advantageously have a low crystallinity in the range of about 0.4 J/g to 75 J/g, although this is preferably about 4.6 J/g to 35 J/g or 15 J/g to 60 J/g, depending upon the desired end use of the polymer. The polymers also have a melt flow rate of between about 0.4 g/10 min. to 60 g/10 min., and every whole integer therebetween. Preferably, the melt flow rate is between about 0.4 g/10 min. to 15 g/10 min. and every whole integer therebetween, more preferably between about 0.4 g/10 min. to 7 g/10 min., and every whole integer therebetween, and most preferably between about 0.5 g/10 min. to 5 g/10 min., and every whole integer therebetween. These FPO polymers are advantageously produced by the use of a catalyst containing a pro-catalyst capable of imparting a low crystallinity and a low melt flow rate, an organometallic compound, and an external modifier that is capable of increasing the low crystallinity up to as high as 60 J/g, depending upon the amount of external modifier included in the catalyst. These FPO polymers have the advantageous property of being steam sterilizable and, therefore, capable of substantially retaining their shape, which other polymers typically cannot do subsequent to steam sterilization.

Internal electron donors, useful for preparing pro-catalysts as in the present invention, are generally categorized into two types: Type I and Type II. Type I internal donors are used to increase the pro-catalyst surface area and, subsequently, the catalyst activity. During the mechanical pulverization by ball milling, the magnesium halide, such as $MgCl_2$, is broken into small crystallites, causing an increase in surface area. However, when the particle size is reduced beyond a certain point, reaggregation of particles occurs due to the increasing surface free energy, thereby preventing further reduction of particle size. The addition of a Type I donor can reduce the surface free energy and, therefore, facilitate the further disintegration of particles. These Type I donors are commonly used in Z-N catalysts. At very low dosage, they may enhance the catalyst activity because of the increased surface area, but when the dosage increases they start to poison the specific active sites. This results in lower catalyst activity, higher isotacticity and higher molecular weight. However, an increased donor dosage is typically and undesirably accompanied by an increased heat of fusion of the polymer. Thus, it would be advantageous for the Type I donor to provide a maximum productivity increase with the least change in heat of fusion. The silane donors of the present invention advantageously accomplish these dual goals when combined with other ingredients to form the pro-catalyst.

Type II internal donors, on the other hand, are used to increase the molecular weight and reduce the low molecular weight ("LMW") fractions that cause the stickiness typically associated with polyolefin polymers. This may be accomplished by either selectively poisoning the active sites that produce the LMW fractions, or depressing the chain transfer reactions on these active sites, while not increasing the crystallinity of the polymer product to any significant extent. It has now been found that some weak Lewis bases, such as certain nitrogen-based donors like 2,6-lutidine and 6-chloro-2-picoline, are effective as Type II donors to increase the molecular weight of polymers without, or not significantly, affecting the crystallinity. They accomplish this by selectively blocking many of the most acidic sites that produce LMW, atactic fractions while also depressing the chain transfer reaction without substantially increasing overall crystallinity. Even these advantageous Type II donors negatively impact on catalyst productivity.

The catalyst includes a pro-catalyst component and an organometallic component, and preferably also includes an external modifier. The pro-catalyst includes a magnesium halide, an aluminum halide, a tetravalent titanium halide, a particular nitrogen-based electron donor, and an internal modifier that is typically a silane component.

In forming the catalyst, any titanium halide is suitable for mixing with the magnesium and aluminum halides, although titanium tetrahalides are preferred and titanium tetrachloride is most preferred. Although any aluminum halide is suitable for use in the catalyst, aluminum trichloride is preferred. Similarly, although any magnesium halide is suitable for use in the catalyst, magnesium dichloride is preferred. The aluminum and magnesium halides may be solid or liquid when mixed, but they are preferably solid. The titanium halide is preferably a liquid when added, as are the electron donor and the silane component.

Although any internal electron donor, as understood by those of ordinary skill in the art, is suitable for use in the catalyst, the Type II internal donor is preferably a nitrogen-based Lewis base. The Lewis base, or electron donor, is more preferably selected from the following: 2,3-dimethylquinoxaline, quinaldine, 2,6-lutidine, 2,4-6-collidine, tetramethylpyrazine, 2,4-dimethylquinoline, 2,6-dichloropyridine, 2-chloroquinoline, 2-chloro-6-methoxypyridine, 2,3-dichloroquinoxaline, 2,4,6-trichloropyrimidine, 2,4,5,6-tetra-chloropyrimidine, 2-chlorolepidine and 6-chloro-2-picoline, and the donor is most preferably 2,6-lutidine, 2,6-dichloropyridine, 6-chloro-2-picoline, or mixtures thereof. No specific amount of Lewis base, or internal electron donor, may be specified in the abstract for use in the catalyst, because the amounts used are relative to amounts of other ingredients in the catalyst recipe. Thus, amounts of the various components must be quantified by the molar ratio relative to each other.

The relative amounts of each component in the catalyst can vary over well defined ranges. Specifically, the molar ratio of Mg:Al:Si:N:Ti is about 8:0.01:0.01:0.2:1 to 80:30:0.5:1.2:1, preferably 12:1:0.1:0.3:1 to 70:25:0.4:1:1 Mg:Al:Si:N:Ti. In a more preferred embodiment, the molar ratio of Mg:Al:Si:N:Ti is about 14.9:1.9:0.2:0.6:1. In these ratios, Mg, Al and Ti designate halides, Si designates the silane component and N designates the electron donor. One of ordinary skill in the art is well aware of how to vary the amounts of the different components to achieve the desired ratios set forth above.

Catalyst preparation typically begins with the magnesium halide and aluminum halide being combined, preferably with some degree of mixing, although this is not required. The preparation occurs around room temperature, although the exact temperature is not a crucial aspect of the invention. The silane component, or internal modifier, is typically in liquid phase and may be added to the halide combination. The silane component has a formula of $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl. A preferred aryl is $C_{6-22}$aryl. Preferably, $R_1$ is $C_{6-12}$cycloalkyl or a mono- or di-substituted $C_{6-12}$cycloalkyl, $R_2$ is H or methyl, more preferably $R_1$ is an unsubstituted $C_{6-12}$cycloalkyl, and most preferably is cyclohexyl. $R_2$ is more preferably methyl. $R_3$ and $R_4$ are preferably an unsubstituted $C_{1-6}$alkyl, more preferably methyl or ethyl, and most preferably methyl. The silane is preferably added by spraying over the halide combination, or some other form of vaporizing, to increase the surface area and contact between the components. As discussed above, the silane component is believed to alter the nature of the magnesium and aluminum halide components by increasing the surface area and pore volume to provide more interstitial space in the magnesium and aluminum halide components for the titanium halide to reside when it is added. The amount of silane added falls within the molar ratio range discussed above.

The silane and halides are preferably mixed, and more preferably pulverized in a ball mill or other suitable vessel to form a first mixture before additional components are added. Ball milling typically involves the tumbling or vibrating of steel or other inert metallic or inert ceramic balls to pound the halide particles and the silane together. The ball milling of the solid pro-catalyst component is preferably accomplished in a 1 L stainless steel rotary mill pot filled to about 50 volume percent with ½" stainless steel balls. It is well understood by those skilled in the art that the specific size of the pot, the ball material, the component phase, and the volume percent filled may be varied as desired.

Although the specific catalyst particle size is not essential, smaller catalyst particle size is believed to be enhance the efficiency of the catalyst. Any length of milling time is sufficient, although it is preferred that the mixing occur over a period of about 4 to 40 hours, more preferably about 8 to 30 hours, and most preferably about 12 to 25 hours.

After ball milling, an electron donor and a titanium halide are combined with the mixture from the initial ball milling. The specific amounts added are determined relative to the other catalyst ingredients, and fall within the molar ratio range described herein. The donor and titanium halide are both preferably liquid, and may be added at once or slowly while all the catalyst ingredients are mixed. They are preferably sprayed into the ball mill or other vessel, although any means of adding them to the first mixture is acceptable. The combination of the electron donor, titanium halide, and first mixture is then mixed, preferably by ball milling. Again, any length of time is sufficient for this mixing stage, although it is preferred that the mixing occur over a period of about 4 to 40 hours, more preferably about 8 to 30 hours, and most preferably about 12 to 25 hours. Example 54 below provides a sample catalyst recipe.

It is well known that supported coordination pro-catalysts and catalyst systems of the type used herein are highly sensitive, in varying degrees, to catalyst poisons such as moisture, oxygen, carbon oxides, acetylenic compounds and sulfur compounds. It will be understood that in the practice of this invention, as well as in the following examples, both the equipment and the reagents and diluents are carefully dried and free of potential catalyst poisons.

Subsequent to formation of the pro-catalyst, the pro-catalyst is combined with a co-catalyst and optionally with an external modifier, to produce flexible polyolefins having reduced tackiness. In addition to the pro-catalyst, a primary organometallic compound, preferably a metallic alkane, and more preferably an aluminum alkane, to be employed as a co-catalyst may be chosen from any of the known activators in olefin polymerization catalyst systems comprising a titanium halide, preferably free of halogens. While aluminum trialkyl compounds, dialkylaluminum halides and dialkylaluminum alkoxides may be used, it is preferable to use aluminumtrialkyl compounds, more preferably those wherein each of the alkyl groups has 1 to 6 carbon atoms, e.g., aluminumtrimethyl, aluminumtriethyl, aluminumtri-n-propyl, aluminumtri-isobutyl, aluminumtri-isopropyl and aluminumdibutyl-n-amyl. Alternatively, these may be used in combination with various alkyl aluminum halides, e.g., diethyl aluminum chloride. In the most preferred embodiment, aluminum triethyl is used as the co-catalyst.

The external modifier may be any silane modifier, but is preferably a silane having a formula of $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl. A preferred aryl is a $C_{6-22}$aryl. Preferably, $R_1$ is $C_{6-12}$cycloalkyl or a mono- or di-substituted $C_{6-12}$cycloalkyl, $R_2$ is H or methyl, more preferably $R_1$ is an unsubstituted $C_{6-12}$cycloalkyl, and most preferably is cyclohexyl. $R_2$ is more preferably methyl. $R_3$ and $R_4$ are preferably an unsubstituted $C_{1-6}$alkyl, more preferably methyl or ethyl, and most preferably methyl. Most preferably, the external modifier is identical to the internal modifier used in the pro-catalyst. Increasing the amount of external modifier typically increases the crystallinity in the polymer ultimately produced. The pro-catalyst with co-catalyst in the absence of an external modifier is capable of producing an FPO polymer with a $H_f$ at a lower range of about 4.6 J/g to 60 J/g, preferably around 15 J/g to 30 J/g, and this may be adjusted upward by increasing the amount of external modifier added to the catalyst up to an $H_f$ of about 60 J/g, and every whole integer therebetween. The preferred amount of external modifier is seen in the Examples below, although other useful amounts are easily determined by those of ordinary skill in the art.

The external modifier may be added in any desired ratio to advantageously provide the desired crystallinity in the FPO polymers, although the molar ratio of Si:Ti (external silane modifier to titanium in the pro-catalyst) will typically be from 0:1 up to about 4:1, and more typically be from 0:1 up to about 1:1. Besides increasing crystallinity up to a maximum of about 75 J/g, the addition of the external modifier tends to decrease the MFR. An MFR as low as 0.3 g/10 min. may be obtained, although the MFR is typically 0.4 g/10 min. to 60 g/10 min. in the FPO polymers. For example, one experiment with an Si:Ti molar ratio of 0.5:1, and an Al:Ti ratio of 200 (organometallic co-catalyst to pro-catalyst) yielded an MFR of about 3 g/10 min., while an Si:Ti ratio of about 4:1 provided an MFR of about 0.3 g/10 min.

To prepare the final polymerization catalyst composition, pro-catalyst, co-catalyst, and external modifier may simply be combined, most suitably employing a molar ratio of pro-catalyst to co-catalyst to produce in the final catalyst a ratio of aluminum to titanium of from about 50:1 to 600:1, preferably from about 70:1 to 400:1, and more preferably from about 80:1 to 300:1. Increasing the Al:Ti ratio may slightly increase catalyst activity at the expense of increased catalyst residue in the unextracted polymeric product. These factors should be considered in selecting the Al:Ti ratio for any given process and desired product. Based on the disclosure herein, particularly of these ratios and the ratios provided above for the pro-catalyst, one skilled in the art can prepare and use a catalyst in accordance with the invention.

While the catalysts of this invention are particularly adapted for use in continuous polymerization systems, they may, of course, also be employed in batch polymerization. When used in continuous polymerization, the catalysts are typically dumped into the reactor in amounts sufficient to replace catalyst used. The productivity of the pro-catalyst or catalyst are generally determined as g polymer/g pro-catalyst, or g polymer/g catalyst, in a standard one hour batch reaction; it may also be expressed as kg polymer/g pro-catalyst. This measure of catalyst efficiency ("CE") is also used for continuous reactions.

Polymerization of propylene, for example, is typically conducted in a polymerization reactor with the catalysts of the invention in a liquid system with an inert diluent such as a paraffinic liquid of 3 to 15 carbon atoms per molecule, or in a liquid system containing propylene as sole diluent or together with a small amount of propane, or in vapor phase. Propylene polymerization in liquid phase is typically conducted at a temperature of about 40° C. to 80° C., more preferably 50° C. to 70° C., and most preferably 55° C. to 65° C., at a pressure sufficient to maintain liquid conditions. Conventional operating conditions for propylene polymerization, other than the novel catalyst preparation and use taught herein, are well known to those skilled in the art and are not essential to the production of the polymers of the present invention. In a continuous reaction system, the liquid in the reaction zone is maintained at reaction conditions, monomer is continuously charged to the reaction zone, catalyst components are also charged continuously or at frequent intervals to the reaction zone, and reaction mixture containing polymer is withdrawn from the reaction zone continuously or at frequent intervals. For example, 660 mL of propylene batch polymerized with 10 mg of catalyst at 60° C. for about 1 h provided a polymer having a $H_f$ of about 27 J/g and an MFR of about 1.6 g/10 min. The catalyst productivity was about 15,200 g polymer per g catalyst.

Polymer Characterization

Several different families of propylene-based polymers, for example, may be prepared in a polymerization reactor. Some examples of these polymer families include, but are not limited to: isotactic propylene homopolymers, isotactic propylene/ethylene copolymers, amorphous poly-α-olefins ("APAO") propylene homopolymers, APAO propylene/ ethylene copolymers, APAO propylene/butene copolymers, FPO propylene homopolymers, FPO propylene/ethylene copolymers, and FPO propylene/butene copolymers. Following the polymerization reaction, conventional processing technology required addition of large amounts of water to transport the polymer to bulky storage tanks for later processing. The FPO polymers may be processed in such a conventional manner, or they may be transported directly from the polymerization reactor to the final extruder via a kneader-extruder device, which assists in devolatilization of unreacted monomer(s). A preferred device, which maintains a substantially constant inventory of polymer therein, is disclosed in co-pending application Ser. Nos. 08/598,820 and 08/630,800, the disclosures of which are expressly incorporated herein by reference thereto. The polymer is fed, whether from conventional storage tanks or the novel kneader-extruder, into the final extruder. In the extruder, the polyolefin material is typically mixed with small amounts of water to deactivate any remaining catalyst(s) in the material and antioxidants. Heating the material further drives off any unreacted monomer(s), antioxidant solvents and excess steam added during this stage. Finally, the polyolefin material is typically transferred to a pelletizer where it is pelletized for storage and/or use.

The FPO polymers are typically propylene homopolymers, but they may also be propylene in a mixture with at least one other monomeric raw material, such as a $C_{2-12}$ alkene. The other monomeric raw materials are alpha-olefins in a preferred embodiment, such as ethylene, 1-butene, 1-pentene, and 1-octene. A particularly preferred component for use with propylene is ethylene, preferably in about 1 to 40 weight percent, and more preferably in about 1 to 20 weight percent, of the polymer composition. In one embodiment, the ethylene is increased in the monomeric raw material to inhibit or substantially eliminate the effects of the external donor to varying degrees, i.e., to inhibit the ability of the external donor to increase the crystallinity of propylene domains within the polyolefin polymer.

The FPO polymers are characterized by a variety of properties. The most important of these properties are the degree of crystallinity and the degree of polymerization. Crystallinity, or heat of fusion ($\Delta H_f$) is typically measured by ASTM Method D-3417 (DSC). The polymers of the present invention have a heat of fusion that may range from about 0.4 J/g to 75 J/g, preferably about 15 J/g to 60 J/g, and more preferably about 25 J/g to 55 J/g, and a melt flow rate of between about 0.3 to 15 g/10 min. (at 230° C.). More preferred melt flow rates are discussed herein. Products produced with the FPO polymers advantageously tend to feel softer, smoother, and more silky to the touch, rather than being more rigid, more tacky and having a slightly sticky feel as with products produced using conventional catalysts. The reduced stickiness is believed to be achieved by increasing the molecular weight average, and, in particular, reducing the low molecular weight portions and decreasing the band of molecular weights. This imparts improved processing characteristics to the flexible polyolefin polymers. This is also believed to be accomplished by the use of an internal modifier present in the pro-catalyst portion of the catalyst present when polymerizing the polyolefin polymers of the present invention. An example of an internal modifier is the nitrogen-based electron donor of the present invention, preferably 2,6-lutidine and 6-chloro-2-picoline. When it is desired to alter the crystallinity of the polyolefin polymers, an external modifier of a silane may be added.

MFR is measured according to ASTM-D1238 standard Method A/B (2.16 kg/230° C.), such as on a Kayness Galaxy I Melt Indexer. The methyl ethyl ketone ("MEK") solution percent was determined by extracting about 5 g of polymer with 100 mL of boiling methyl ethyl ketone for 6 hours. Tensile tests (ASTM-D638) were performed on an Instron 1125 with Type I injection molded tensile bars at test speed of 2"/min. The VICAT softening point was measured in accordance with ASTM-D1525. Shore D hardness was determined in accordance with ASTM-D2240. Percent tensile set was measured after 300 percent extension and calculated by the following equation:

$$\% \text{ Tensile Set} = (L_f - L_i)/(L_n - L_i) \times 100\%$$

where $L_i$ is the initial separation, $L_n$ is the extension, and $L_f$ is the final separation. A variety of other characteristics may be used to describe these polymers as well, such as VICAT softening point of about 40° C. to 75° C., and preferably 45° C. to 70° C.; Shore D hardness of about 30 to 65, and more preferably about 40 to 55; tensile modulus; tensile stress; a melt swell ratio of about 1.6 or below, preferably about 1.5 or below, and most preferably about 1.4 or below; and the like. The VICAT softening point and Shore D hardness will vary depending on the melt flow rate, heat of fusion, and the like in the polymer product. The properties vary depending upon the specific FPO polymer produced, which is dependent upon the exact ratios of Al:Ti (co-catalyst to pro-catalyst) and Si:Ti (external modifier to pro-catalyst), as well as the specific silane or other similar compound used in the pro-catalyst and the external modifier. Thus, these polymers are defined primarily by means of their crystallinity, or heat of fusion, their melt flow rate, and their molecular weight distribution, or polydispersity index ("MWD" or "PDI").

The molecular weight distribution, or polydispersity index, of the FPO polymers is about 10 or lower, preferably about 9 or lower, and most preferably about 8.5 or lower. The PDI is a ratio of the molecular weight average ($M_w$) over the molecular number average ($M_n$). The melt swell ratio is measured by the ratio of the diameter of a strand of extruded polymer to the diameter of the orifice through which it was extruded. A lower melt swell ratio is an indicator of a lower PDI, which itself indicates a narrower molecular weight distribution and, therefore, a less sticky, tacky, FPO polymer product. A low PDI combined with a low melt flow rate advantageously provides the polymers of the present invention with characteristics desired in the art. For example, a low MFR is characteristic of the reduced stickiness associated with the processing of the polymer, both during production and as a final product for consumer or industrial usage. Additionally, the low MFR of the FPO polymers tends to result in a higher melt strength and higher viscosity, which vastly facilitates the production of various useful articles such as blown films. "Reduced stickiness" and "reduction in stickiness," as used herein, typically is measured by the MEK soluble fraction of the polymer. A polymer having reduced stickiness is generally where about 1 to 12 weight percent, preferably about 2 to 5 weight percent, of the polymer is soluble in MEK.

Various additives may be included in the FPO polymers, such as antioxidants, UV stabilizers, pigments, and the like. Adding or removing hydrogen during the polymerization described herein may affect the MFR of the FPO polymers, while having minimal impact on the degree of crystallinity.

A variety of products may be produced using the polymers of the present invention, such as for polymer blend additives. The polymers herein may be formed as an: extrusion or extrusion coatings, such as a film extrusion, sheet extrusion, paper extrusion, aluminum foil extrusion, cellophane extrusion, or contour extrusion; molding, such as injection molding or blow molding; coating, such as wire coating or cable coating; resin, such as wax fortifying resins or potting and impregnating resins; monofilaments; hot-melt adhesives; and powdered, such as rug backing powder, rotational molding powder, powder molding, protective coatings on rigid surfaces, and fabric coating powder. These methods of forming polymer products and the polymer products are not exhaustive, and one of ordinary skill in the art can envision a broad array of useful products and processes to manufacture such products with a polymer of the present invention. For example, a molding is a process typically understood to provide end-products such as foams, webs, sheets, films, and the like. One particularly useful polymer product is films, which are understood by those of ordinary skill in the art to have a thickness of about 0.5 mils to 10 mils. One benefit of these polymers is that they substantially maintain the same physical shape during steam autoclaving. Those of ordinary skill in the art will readily understand the conditions under which steam autoclaving occurs, typically at temperatures of at least 100° C. and pressures of at least atmospheric pressure.

EXAMPLES

The invention is further defined by reference to the following examples describing in detail the preparation of the compounds and compositions of the present invention. It will be apparent to those skilled in the art that many modifications, both to materials and methods, may be practiced without departing from the purpose and interest of this invention.

A variety of catalysts for the preparation of FPO polymers were prepared and tested. Polymerization tests were conducted in liquid propylene in a 1.0 L stainless steel autoclave equipped with an agitator. After the reactor was thoroughly purged with nitrogen to remove any catalyst poisons, such as moisture and oxygen, 10 mg of solid pro-catalyst component were charged into the reactor as a 1 weight percent mixture in dry mineral oil, followed by addition of triethylaluminum co-catalyst in a prescribed amount to obtain an Al/Ti molar ratio of about 200:1. 300 g of liquid propylene were then charged into the reactor and the polymerization proceeded at 60° C. for one hour under agitation sufficient to mix the components. At the end of the hour, the unreacted propylene was vented off and the polymer product was recovered.

The "C-Donor" was cyclohexylmethyldimethoxysilane, and "D-Donor" was dicyclopentyldimethoxysilane.

Examples 1–2

Conventional Catalysts

A conventional catalyst may be prepared according to the disclosure of U.S. Pat. No. 4,347,158. Example 1 of the '158 patent describes such a catalyst preparation as follows. Anhydrous $MgCl_2$ was prepared by drying at 350° C. for 4 hours under an HCl blanket. 25 grams of this anhydrous $MgCl_2$, 4.34 g $AlCl_3$, and 7.01 g anisole were charged under nitrogen atmosphere into a vibrating ball mill having a 0.6 L capacity containing 316 stainless steel balls weighing a total of 3250 g and each having a diameter of 12 mm. This mixture was co-comminuted for 24 hours without temperature control. Titanium tetrachloride was precomplexed with ethyl benzoate (EB) in n-heptane at about 50° C. 6.19 g of this $TiCl_4 EB$ complex was then charged into the vibrating ball mill after the prior 24 hour co-comminution of the other materials, and the resulting mixture co-comminuted for an additional 20 hours at ambient temperature and under inert atmosphere. This produced a solid catalyst component usable without requiring extraction or catalyst washing.

Another conventional catalyst was prepared, for comparison purposes with the catalysts of the present invention, approximately as follows: 30 g (0.315 mole) of $MgCl_2$ was co-comminuted with 5.22 g (0.0391 mole) $AlCl_3$ for 24 h in RBM under $N_2$ atmosphere. Then 4.02 g (0.0212 mole) of $TiCl_4$ was added. Ball milling was continued for another 24 h. 30 g yellow pro-catalyst powder was collected. It was calculated that the titanium component was about 2.6 weight percent, the aluminum component was about 2.7 weight percent, the magnesium component was about 19.3 weight percent, and the Mg:Al:Ti ratio was about 8:1:0.5.

Examples 3–19

Effect of Type I Internal Donors

A variety of pro-catalysts and catalysts were prepared to examined the effect of Type I internal donors on the effective surface area and catalyst activity:

Example 3: Same as Example 6 below, except using 1.18 g EtOBz. Calc'd: Ti %=2.50; EB/Mg=0.025 (mol/mol).

Example 4: $MgCl_2$ of 30 g, $AlCl_3$ of 5.25 g and EtOBz of 2.36 g (0.0158 mole) were ball milled (VBM) for 16 h, then $TiCl_4$ of 4.02 g was added and the mixture was ball milled for another 16 h. Calc'n: Ti %=2.43; EB/Mg=0.05 (mol/mol).

Example 5: Same as Example 6, except using 4.72 g EtOBz. Calc'd: Ti %=2.31; EB/Mg=0.10 (mol/mol).

Example 6: 30 g $MgCl_2$ and 5.25 g $AlCl_3$ were ball milled (RBM) for 24 h, then 1.55 g (0.0131 mole) $(EtO)SiMe_3$ and 4.02 g $TiCl_4$ were added. The mixture was ball milled for another 24 h to give the pro-catalyst.

Example 7: 30 g $MgCl_2$ and 5.25 g $AlCl_3$ were ball milled (RBM) for 24 h, then 3.1 g (0.0263 mole) $(EtO)SiMe_3$ and 4.02 g $TiCl_4$ were added. The mixture was ball milled for another 24 h to give the pro-catalyst.

Example 8: 30 g $MgCl_2$ and 5.25 g $AlCl_3$ were ball milled (RBM) for 24 h, then 6.15 mL (0.0394 mole) $(EtO)SiMe_3$ and 4.02 g $TiCl_4$ were added. The mixture was ball milled for another 24 h to give the pro-catalyst.

Example 9: 30 g $MgCl_2$ and 5.25 g $AlCl_3$ were ball milled (RBM) for 24 h, then 2.47 g (0.0131 mole) C-donor and 4.02 g $TiCl_4$ were added. The mixture was ball milled for another 24 h to give the pro-catalyst.

Example 10: 30 g $MgCl_2$ and 5.25 g $AlCl_3$ were ball milled (RBM) for 24 h, then 7.42 g (0.0394 mole) C-donor and 4.02 g $TiCl_4$ were added. The mixture was ball milled for another 24 h to give the pro-catalyst.

Example 11: 30 g $MgCl_2$ and 5.25 g $AlCl_3$ were ball milled (RBM) for 24 h, then 3.0 g (0.0131 mole) D-donor and 4.02 g $TiCl_4$ were added. The mixture was ball milled for another 24 h to give the pro-catalyst.

Example 12: 30 g $MgCl_2$ and 5.25 g $AlCl_3$ were ball milled (RBM) for 24 h, then 9.0 g (0.0394 mole) D-donor and 4.02 g $TiCl_4$ were added. The mixture was ball milled for another 24 h to give the pro-catalyst.

Example 13: 5 g of Example 2 was suspended in 100 mL toluene, stirred at 60° C. for 1 h, filtered and suspended in 30 mL fresh toluene. 16.5 mL $TiCl_4$ and 0.74 mL (3.2 mmole) D-donor (Dicyclopentyldimethoxysilane) were added. Mixture was stirred at 90° C. for 1 h, filtered (solid dark brown), washed with heptane (turned to greenish yellow) and toluene (back to dark brown), again suspended in 30 mL toluene. 17 mL $TiCl_4$ was charged and mixture was stirred at 90° C. for another 1 h. Solid filtered out and thoroughly washed with heptane.

Example 14: 1) $MgCl_2$ 30 g, $AlCl_3$ 5.25 g and $(EtO)_3SiMe$ 7.02 g (0.0394 mole) were ball milled for 24 h. 2) 5 g of above precursor was suspended in 100 mL toluene, stirred at 60° C. for 1 h, filtered, solid washed with heptane, toluene and then suspended in 30 mL fresh toluene. 16.5 mL (150 mmole) $TiCl_4$ was charged (slurry turned brown). The slurry was stirred at 90° C. for 1 h, filtered, solid washed with heptane, toluene, then again suspended in 30 mL toluene. 16.5 mL $TiCl_4$ was charged and reacted at 90° C. for 1 h. The solid was washed with heptane. The solid was orange-red in toluene but turned to yellow after washed by heptane.

Example 15: 30 g $MgCl_2$ and 5.25 g $AlCl_3$ were ball milled (RBM) for 24 h, then 6.69 g (0.0394 mole) $SiCl_4$ and 4.02 g $TiCl_4$ were added. The mixture was ball milled for another 24 h to give the pro-catalyst.

Example 16: 30 g $MgCl_2$, 5.25 g $AlCl_3$ and 2.76 g dibutyl phthalate were co-ball milled for 24 h, then 4.02 g $TiCl_4$ was added. The mixture was ball milled for another 24 h to provide the pro-catalyst.

Example 17: 30 g $MgCl_2$ and 2.76 g dibutyl phthalate were co-ball milled for 24 h, then 4.02 g $TiCl_4$ was added. The mixture was ball milled for another 24 h to provide the pro-catalyst.

Example 18: 30 g $MgCl_2$ and 5.25 g $AlCl_3$ were ball milled (RBM) for 24 h, then 7.68 g (0.0212 mole) diheptyl phthalate and 4.02 g (0.0212 mole) $TiCl_4$ were charged and ball milled for another 24 h.

Example 19: Same as Example 14 except without (EtO)$_3$SiMe but with dropwise addition of 1.17 mL diheptyl phthalate (turned dark) before reacting at 90° C. for 1 h.

These pro-catalysts were used in a catalyst for the polymerization of polypropylene to produce polymers having characteristics set forth in the Table below:

catalyst that produces a smaller amount of the low molecular weight FPO polymers than typical.

Example 20: See Example 2.

Example 21: 30 g $MgCl_2$ and 5.25 g $AlCl_3$ were ball milled (RBM) for 24 h, then 4.46 g (0.0394 mole) cis 2,6-dimethylpiperidine and 4.02 g $TiCl_4$ were added. The mixture was ball milled for another 24 h to give the pro-catalyst.

Example 22: 30 g $MgCl_2$ and 5.25 g $AlCl_3$ were ball milled (RBM) for 24 h, then 5.56 g (0.0393 mole) 2,2,6,6-

| Example Number | Composition | Donor | Donor/Ti | Polymn. Run No | C.E. g/g-cat | $\Delta H_f$ J/g | m.p. ° C. | MFR g/10 min | MEK mol % |
|---|---|---|---|---|---|---|---|---|---|
| 1 | $TiCl_4/MgCl_2/AlCl_3/$ EB/Anisole | EB & Anisole | nd | 2507-39 | 11900 | 42.9 | 155.9 | 11 | nd |
| 2 | $TiCl_4/MgCl_2/AlCl$ (BM) | None | 0 | 2536-1 | 16500 | 30 | 154 | 11 | 11 |
| 3 | $TiCl_4/MgCl_2/AlCl_3/$ EB (BM) | Ethyl Benzoate | 0.37 | 2536-25 | 17600 | 31.8 | 153.8 | 10.3 | 12.5 |
| 4 | $TiCl_4/MgCl_2/AlCl_3/$ EB (BM) | Ethyl Benzoate | 0.74 | 2536-21 | 18500 | 35.1 | 154.5 | 9.6 | 11.1 |
| 5 | $TiCl_4/MgCl_2/AlCl_3/$ EB (BM) | Ethyl Benzoate | 1.48 | 2536-27 | 13800 | 39.2 | 154.7 | 7.4 | 12.2 |
| 6 | $TiCl_4/MgCl_2/AlCl_3/$ (EtO)SiMe$_3$ (BM) | (EtO)SiMe3 | 0.62 | 2540-31 | 18800 | 36.1 | 153.9 | 8.4 | 10.4 |
| 7 | $TiCl_4/MgCl_2/AlCl_3/$ (EtO)SiMe$_3$ (BM) | (EtO)SiMe3 | 1.24 | 2536-99 | 23300 | 39.6 | 153.5 | S.9 | 7.6 |
| 8 | $TiCl_4/MgCl_2/AlCl_3/$ (EtO)SiMe$_3$ (BM) | (EtO)SiMe3 | 1.86 | 2536-97 | 21000 | 43.9 | 152.4 | 15.3 | 7.8 |
| 9 | $TiCl_4/MgCl_2/AlCl_3/$ C-donor (BM) | C-donor | 0.62 | 2540-7 | 19400 | 33.7 | 153.1 | 8.6 | 7.8 |
| 10 | $TiCl_4/MgCl_2/AlCl_3/$ C-donor (BM) | C-donor | 1.86 | 2536-95 | 13400 | 40.9 | 152.8 | 7.5 | 5.5 |
| 11 | $TiCl_4/MgCl_2/AlCl_3$/D-donor (BM) | D-donor | 0.62 | 25406 | 19800 | 35.9 | 153.7 | 9.9 | 5.7 |
| 12 | $TiCl_4/MgCl_2AlCl_3$/D-donor (BM) | D-donor | 1.86 | 2536-93 | 13800 | 36.9 | 154.4 | 3.6 | 4.7 |
| 13 | $TiCl_4/MgCl_2/AlCl_3$/D-donor (Solution) | D-donor | nd | 253662 | 27300 | 37.7 | 154.2 | 12.7 | 9.4 |
| 14 | $TiCl_4/MgCl_2/AlCl_3/$ (EtO)$_3$SiMe (Solution) | (EtO)$_3$SiMe | nd | 2536-54 | 18200 | 51.1 | 155.2 | 4.6 | 7.9 |
| 15 | $TiCl_4/MgCl_2/AlCl_3/SiCl_4$ (BM) | $SiCl_4$ | 1.86 | 2536-91 | 17500 | 34.2 | 153.6 | 13.7 | 7.1 |
| 16 | $TiCl_4/MgCl_2/AlCl_3$/DBP (BM) | Dibutyl Phthalate | 0.47 | 2541-59 | 13900 | 46.9 | 156.0 | 4.2 | 8.4 |
| 17 | $TiCl_4/MgCl_2$/DBP (BM) | Dibutyl Phthalate | 0.47 | 254162 | 9900 | 44.2 | 155.4 | 4.0 | 6.8 |
| 18 | $TiCl_4/MgCl_2/AlCl_3$/DHP (BM) | Diheptyl Phthalate | 1 | 2536-58 | 10700 | 49.7 | 156.1 | 0.75 | 4.5 |
| 19 | $TiCl_4/MgCl_2/AlCl_3$/DHP (Solution) | Diheptyl Phthalate | nd | 2536-56 | 9700 | 49.7 | 156.7 | 1.2 | 7.1 | nd = not determined
Polymerization conditions: 10 mg catalyst; 300 g propylene; Al/Ti = 200; 60° C. for 1 hour.

Examples 3–19 illustrate a variety of Type I donors and their effects on polymer properties. They were typically co-milled with catalyst supports ($MgCl_2/AlCl_3$) prior to $TiCl_4$ addition, except for the catalysts made by a solution process. The effect of the donors produced by the ball-mill method on productivity indicates silane donors are more effective than other donors in enhancing the productivity at low dosages. Those donors prepared by the solution process indicate a productivity enhancement that, with increasing donor dosage, also indicates an increased heat of fusion of the polymer. The desired donors are those that yield the maximum productivity increase while causing the minimum change to the heat of fusion. Silane donors advantageously meet the criteria most effectively.

Examples 20–31
Effect of Type II Internal Donors

A variety of these catalysts were examined for Type II internal donor characteristics in an attempt to locate a tetramethylpiperidine and 4.02 g $TiCl_4$ were added. The mixture was ball milled for another 24 h to give the pro-catalyst.

Example 23: 30 g $MgCl_2$ and 5.25 g $AlCl_3$ were ball milled (RBM) for 24 h, then 4.19 mL (0.0394 mole) 2,5-dimethylfuran and 4.02 g $TiCl_4$ were added. The mixture was ball milled for another 24 h to give the pro-catalyst.

Example 24: 30 g $MgCl_2$ and 5.25 g $AlCl_3$ were ball milled (RBM) for 24 h, then 3.95 g (0.0394 mole) 2,5-dimethyltetrafuran and 4.02 g $TiCl_4$ were added. The mixture was ball milled for another 24 h to give the pro-catalyst.

Example 25: 30 g $MgCl_2$ and 5.25 g $AlCl_3$ were ball milled (RBM) for 24 h, then 3.67 g (0.0394 mol) 2-picoline and 4.02 g $TiCl_4$ were added. The mixture was ball milled for another 24 h to give the pro-catalyst.

Example 26: 21.4 g $MgCl_2$ and 3.75 g $AlCl_3$ were ball milled (RBM) for 24 h, then 5.0 g (0.0281 mole)

4-chloroquinaldine and 2.85 g $TiCl_4$ were added. The mixture was ball milled for another 24 h to give the pro-catalyst.

Example 27: 30 g $MgCl_2$ and 5.25 g $AlCl_3$ were ball milled (RBM) for 24 h, then 4.59 mL (0.0394 mole) 2,6-Lutidine and 4.02 g $TiCl_4$ were added. The mixture was ball milled for another 24 h to give the pro-catalyst.

Example 28: 30 g $MgCl_2$ and 5.25 g $AlCl_3$ were ball milled (RBM) for 24 h, then 4.77 g (0.0393 mole) 2,4,6-collidine and 4.02 g $TiCl_4$ were added. The mixture was ball milled for another 24 h to give the pro-catalyst.

Example 29: 30 g $MgCl_2$ and 5.25 g $AlCl_3$ were ball milled (RBM) for 24 h, then 5.0 g (0.0394 mole) 6-chloro-2-picoline and 4.02 g $TiCl_4$ were added. The mixture was ball milled for another 24 h to give the pro-catalyst.

Example 30: 30 g $MgCl_2$ and 5.25 g $AlCl_3$ were ball milled (RBM) for 24 h, then 5.83 g (0.0393 mole) 2,6-dichloropyridine and 4.02 g $TiCl_4$ were added. The mixture was ball milled for another 24 h to give the pro-catalyst.

Example 31: 30 g $MgCl_2$ and 5.25 g $AlCl_3$ were ball milled (RBM) for 24 h, then 9.33 g (0.0394 mol) 2,6-dibromopyridine and 4.02 g $TiCl_4$ were added. The mixture was ball milled for another 24 h to give the pro-catalyst.

These catalysts were used in the polymerization of polypropylene to produce polymers having characteristics set forth in the Table below:

Example 32: 30 g $MgCl_2$ and 5.25 g $AlCl_3$ were ball milled (RBM) for 5 h, 1.55 g (0.0131 mole) $(EtO)SiMe_3$ was added and ball milled for 19 h, then 4.22 g (0.0394 mole) 2,6-Lutidine and 4.02 g $TiCl_4$ were added. The mixture was ball milled for another 24 h to give the pro-catalyst.

Example 33: 30 g $MgCl_2$ and 5.25 g $AlCl_3$ were ball milled (RBM) for 24 hrs., then 3.1 g (0.026 mole) (EtO)$SiMe_3$ and 4.02 g $TiCl_4$ were added. The mixture was ball milled for another 24 hrs. 10 g of this mixture were suspended in 30 mL toluene, to which 33 mL TiCl4 and 0.75 mL (0.0064 mole) 2,6-Lutidine were added. The mixture was stirred at 90° C. for 1 h, then filtered (filtrate orange) and washed with heptane for 3 times to give the yellow pro-catalyst.

Example 34: 30 g $MgCl_2$, 5.25 g $AlCl_3$ and 0.74 g diethoxydimethylsilane were co-ball milled for 24 h, then 1.41 g 2,6-Lutidine and 4.02 g $TiCl_4$ were added. The mixture was ball milled for another 24 h to give the pro-catalyst.

Example 35: 30 g $MgCl_2$, 5.25 g $AlCl_3$ and 0.95 g C-donor were ball milled (RBM) for 24 h, then 1.41 g (0.0131 mol) 2,6-Lutidine and 4.02 g $TiCl_4$ were added. The mixture was ball milled for another 24 h to give the pro-catalyst.

Example 36: 30 g $MgCl_2$, 5.25 g $AlCl_3$ and 1.23 g dicyclopentyldimethoxysilane were ball milled for 24 h, then 1.41 g 2,6-Lutidine and 4.02 g $TiCl_4$ were added. The mixture was ball milled for another 24 h to give the pro-catalyst.

| Example No.[a] | Donor | Polymn Run No[b] | C.E. g/g-cat · h | $\Delta H_f$ J/g | M.P. ° C. | MFR g/10 min | MEK Sol % | $M_n$ ×10$^{-3}$ | $M_w$ ×10$^{-3}$ | PDI |
|---|---|---|---|---|---|---|---|---|---|---|
| 20 | None | 2536-1 | 16500 | 30 | 154 | 11 | 11 | 21 | 209 | 9.9 |
| 21 | 2,6-dimethylpiperidine | 2536-79 | 7900 | 35.9 | 154.3 | 4.0 | 6.0 | 28 | 239 | 8.47 |
| 22 | 2,2,6,6-Tetramethylpiperidine | 2540-51 | 7400 | 51.1 | 156.4 | 0.68 | 5.9 | 33 | 385 | 12.2 |
| 23 | 2,5-dimethylfuran | 2536-76 | 14000 | 35.1 | 154.1 | 6.4 | S.4 | 27 | 277 | 9.6 |
| 24 | 2,5-dimethyl-tetrahydrofuran | 2536-80 | 14700 | 28.4 | 153.6 | 18.4 | 9.2 | 20 | 201 | 9.9 |
| 25 | 2-picoline | 2540-84 | 13700 | 27.8 | 153.6 | 7.3 | 11.0 | 22 | 214 | 9.7 |
| 26 | 4-chloroquinaldine | 2536-86 | 6500 | 30.2 | 154.4 | 3.6 | 7.6 | 25 | 239 | 9.4 |
| 27 | 2,6-Lutidine | 2536-68 | 6800 | 27.5 | 155.0 | 1.4 | 4.8 | 36 | 283 | 7.8 |
| 28 | 2,4,6-collidene | 2540-37 | 9000 | 29.7 | 154.7 | 1.22 | 4.62 | | | |
| 29 | 6-chloro-2-picoline | 2536-83 | 9300 | 27.5 | 154.5 | 1.2 | 3.8 | 36 | 280 | 7.8 |
| 30 | 2,6-dichloropyridine | 2540-35 | 9100 | 26.9 | 154.4 | 3.1 | 8.1 | 32 | 265 | 8.29 |
| 31 | 2,6-dibromopyridine | 2540-86 | 9300 | 27.6 | 153.6 | 2.1 | 8.9 | 29 | 295 | 10.3 |

[a]Catalyst general composition: $TiCl_4/MgCl_2/AlCl_3$/Donor, ball milled, Donor/Ti = 1.86.
[b]Polymerization conditions: 10 mg catalyst; Al/Ti = 200; 60° C. for 1 h.

Examples 20–31 illustrate a variety of Type II donors, including aromatic, sterically hindered nitrogen-based Lewis base donors. It was desired to obtain a higher molecular weight indicated by a lower MFR, while having a minimal effect on crystallinity. The results above suggest that: (1) the nitrogen-based donors are generally more effective in increasing molecular weight than oxygen-based donors (Examples 23 and 24, for example); (2) non-aromatic nitrogen-based Lewis bases, e.g., Examples 21 and 22, had a more pronounced effect on polymer heat of fusion than the aromatic derivatives, the latter being weaker Lewis bases; and (3) the steric hindrance around the nitrogen atom importantly appears to increase steric hindrance from 2-picoline to 2,6-lutidine to 2,6-dibromopyridine, with the low molecular weight fractions first decreased, then increased again. 2,6-lutidine and 6-chloro-2-picoline were more effective in reducing the LMW fractions.

Examples 32–44
Combinations of Type I and Type II Donors

A variety of catalysts were prepared and tested to obtain a good productivity, while yielding higher molecular weight and lower crystallinity:

then 1.41 g 2,6-Lutidine and 4.02 g $TiCl_4$ were added. The mixture was ball milled for another 24 h to give the pro-catalyst.

Example 37: 30 g $MgCl_2$, 5.25 g $AlCl_3$ and 1.38 dibutyl phthalate were ball milled for 24 h, then 1.41 g 2,6-lutidine and 4.02 g $TiCl_4$ were added. The mixture was ball milled for another 24 h to give the pro-catalyst.

Example 38: 30 g $MgCl_2$, 5.25 g $AlCl_3$ and 0.95 g C-donor were ball milled (RBM) for 24 h, then 1.66 g (0.0131 mol) 6-chloro-2-picoline and 4.02 g $TiCl_4$ were added. The mixture was ball milled for another 24 h to give the pro-catalyst.

Example 39: 30 g $MgCl_2$, 5.25 g $AlCl_3$ and 0.95 g C-donor were ball milled (RBM) for 24 h, then 3.32 g (0.0262 mol) 6-chloro-2-picoline and 4.02 g $TiCl_4$ were added. The mixture was ball milled for another 24 h to give the pro-catalyst.

Example 40: 5 g of the pro-catalyst in Example 2 was suspended in 100 mL toluene and stirred at 60° C. for 1 h. The solid was filtered out and re-suspended in 30 mL toluene. 16.5 mL TiCl$_4$ and 0.1 mL (0.0005 mole) C-donor were added into the suspension. The mixture was then stirred at 90° C. for 1 h, filtered and washed with heptane then toluene. The solid was re-suspended in 30 mL toluene and mixed with 16.5 mL TiCl$_4$ and 0.41 g (0.0032 mole) 6-chloro-2-picoline. The mixture was brought to reaction at 90° for another hour, then filtered and washed with heptane for 3 times to give the pro-catalyst.

Example 41: 5 g of the pro-catalyst in Example 2 was suspended in 100 mL toluene and stirred at 60° C. for 1 h. The solid was filtered out and re-suspended in 30 mL toluene. 16.5 mL TiCl$_4$ and 0.25 mL (0.001 mole) D-donor were added into the suspension. The mixture was then stirred at 90° C. for 1 h, filtered and washed with heptane twice. The solid was re-suspended in 30 mL toluene and mixed with 16.5 mL TiCl$_4$ and 0.41 g (0.0032 mole) 6-chloro-2-picoline. The mixture was brought to reaction at 90° for another hour, then filtered and washed with heptane for 3 times to give the pro-catalyst.

Example 42: 5 g of the pro-catalyst in Example 2 was suspended in 100 mL toluene and stirred at 60° C. for 1 h. The solid was filtered out and re-suspended in 30 mL toluene. 16.5 mL TiCl$_4$ and 0.1 mL (0.0004 mole) D-donor were added into the suspension. The mixture was then stirred at 90° C. for 1 h, filtered and washed with heptane then toluene. The solid was re-suspended in 30 mL toluene and mixed with 16.5 mL TiCl$_4$ and 0.41 g (0.0032 mole) 6-chloro-2-picoline. The mixture was brought to reaction at 90° for another hour, then filtered and washed with heptane for 3 times to give the pro-catalyst.

Example 43: 30 mg MgCl$_2$ and 5.25 g AlCl$_3$ were ball milled (RBM) for 24 hrs., then 1.55 g (0.013 mole) (EtO)SiMe$_3$ and 4.02 g TiCl$_4$ were added. The mixture was ball milled for another 24 hrs. 5 g of this mixture was suspended in 100 mL toluene and stirred at 80° C. for 1 h. The solid was filtered out and re-suspended in 30 mL toluene. 16.5 mL TiCl$_4$ and 0.41 g (0.0032 mole) 6-chloro-2-picoline were added into the suspension. The mixture was then stirred at 90° C. for 1 h, filtered and washed with heptane for three times to give the pro-catalyst.

Example 44: 5 g of the mixture of Example 43 was suspended in 100 mL toluene and stirred at 80° C. for 1 h. The solid was filtered out and re-suspended in 30 mL toluene. 16.5 mL TiCl$_4$ and 0.0032 mole 2,6-dichloropyridine (dissolved in toluene) were added into the suspension. The mixture was then stirred at 90° C. for 1 h, filtered and washed with heptane for three times to give the pro-catalyst.

These pro-catalysts were used in catalysts for the polymerization of polypropylene to produce polymers having characteristics set forth in the Table below:

| Example Number | A-type Donor (Donor/Ti) | B-type Donor (Donor/Ti) | Polymn. Run No | C.E. g/g-cat·h | $\Delta H_f$ J/g | M.P. °C. | MFR g/10 min | MEK Sol % |
|---|---|---|---|---|---|---|---|---|
| 32 (BM) | (EtO)SiMe$_3$ Si/Ti = 0.62 | 2,6-Lutidine N/Ti = 1.86 | 2540-24 | 4500 | 36.8 | 153.5 | 1.2 | 7.1 |
| 33 (solution) | (EtO)SiMe$_3$ Si/Ti nd | 2,6-Lutidine N/Ti nd | 2540-39 | 10900 | 42.6 | 155.3 | 1.3 | 4.4 |
| 34 (BM) | (EtO)$_2$SiMe$_2$ Si/Ti = 0.23 | 2,6-Lutidine N/Ti = 0.62 | 2541-53 | 14300 | 36.6 | 154.2 | 1.9 | 7.2 |
| 35 (BM) | C-donor Si/Ti = 0.23 | 2,6-Lutidine N/Ti = 0.62 | 2541-91 | 15500 | 28.3 | 152.9 | 1.6 | 8.0 |
| 36 (BM) | D-Donor Si/Ti = 0.23 | 2,6-Lutidine N/Ti = 0.62 | 2541-51 | 14000 | 38.3 | 154.5 | 1.3 | 5.3 |
| 37 (BM) | Dibutyl phthalate DBP/Ti = 0.23 | 2,6-Lutidine N/Ti = 0.62 | 2541-23 | 10500 | 32.9 | 154.5 | nd | 7.4 |
| 38 (BM) | C-donor Si/Ti = 0.23 | 6-chloro-picoline N/Ti = 0.62 | 2540-96 | 14700 | 29.6 | 153.7 | 3.1 | 7.4 |
| 39 (BM) | C-donor Si/Ti = 0.23 | 6-chloro-2-picoline N/Ti = 1.24 | 2540-98 | 10500 | 27.8 | 153.8 | 1.2 | 7.0 |
| 40 (solution) | C-donor Si/Ti n.d. | 6-chloro-2-picoline N/Ti n.d. | 2540-77 | 9300 | 26.7 | 154.1 | 1.0 | 6.5 |
| 41 (solution) | D-donor Si/Ti n.d | 6-chloro-2-picoline N/Ti n.d. | 2540-53 | 15700 | 29.7 | 153.3 | 1.8 | 5.7 |
| 42 (solution) | D-donor Si/Ti n.d. | 6-chloro-2-picoline N/Ti n.d. | 2540-47 | 9700 | 28.1 | 155.0 | 1.7 | 5.7 |
| 43 (solution) | (EtO)SiMe$_3$ Si/Ti n.d. | 6-chloro-2-picoline N/Ti n.d. | 2540-47 | 8300 | 35.7 | 155.4 | 1.0 | 6.8 |
| 44 (solution) | (EtO)SiMe$_3$ Si/Ti n.d. | 2,6-dichloropyridine N/Ti n.d. | 2540-49 | 19100 | 36.1 | 154.1 | 4.2 | 6.9 |

BM = ball milling

The goal of Examples 32–44 was to obtain a catalyst with good productivity, while yielding higher molecular weight and lower crystallinity. Examples 32–44 illustrate the combinations of these donors by both ball mill and solution process. It appeared that the most promising combinations are those between C-donor, D-donor and 2,6-Lutidine, 6-chloro-2-picoline. D-donor and 2,6-Lutidine seemed to cause slightly higher heat of fusion. Also, the solution process appeared less advantageous as compared to the ball mill process.

Examples 45–53

Optimization of Catalyst Formulation With C-donor (Type I) and 2,6-Lutidine (Type II)

Likely candidates for catalysts having all desired properties were selected to optimize all characteristics in the catalyst and resulting FPO polymer:

Example 45: 30 g MgCl$_2$ and 5.25 g AlCl$_3$ were ball milled (RBM) for 24 h, then 4.59 mL (0.0394 mole) 2,6-Lutidine and 4.02 g TiCl$_4$ were added. The mixture was ball milled for another 24 h to give the pro-catalyst.

Example 46: 30 g MgCl$_2$ and 5.25 g AlCl$_3$ were ball milled (RBM) for 24 h, then 2.81 g (0.0262 mol) 2,6-Lutidine and 4.02 g TiCl$_4$ were added. The mixture was ball milled for another 24 h to give the pro-catalyst.

Example 47: 30 g MgCl$_2$ and 5.25 g AlCl$_3$ were ball milled (RBM) for 24 h, then 1.41 g (0.0131 mol) 2,6-Lutidine and 4.02 g TiCl$_4$ were added. The mixture was ball milled for another 24 h to give the pro-catalyst.

Example 48: 30 g MgCl$_2$ and 5.25 g AlCl$_3$ were ball milled (RBM) for 24 h, then 0.74 g (0.0069 mol) 2,6-Lutidine and 4.02 g TiCl$_4$ were added. The mixture was ball milled for another 24 h to give the pro-catalyst.

Example 49: 30 g MgCl$_2$ and 5.25 g AlCl$_3$ were ball milled (RBM) for 24 h, then 1.41 g (0.0131 mol) 2,6-Lutidine and 8.04 g TiCl$_4$ were added. The mixture was ball milled for another 24 h to give the pro-catalyst.

Example 50: 30 g MgCl$_2$, 5.25 g AlCl$_3$ and 0.95 g C-donor were ball milled (RBM) for 24 h, then 1.41 g (0.0131 mol) 2,6-Lutidine and 8.04 g TiCl$_4$ were added. The mixture was ball milled for another 24 h to give the pro-catalyst.

Example 51: 30 g MgCl$_2$, 5.25 g AlCl$_3$ and 0.48 g C-donor were ball milled (RBM) for 24 h, then 1.41 g (0.0131 mol) 2,6-Lutidine and 4.02 g TiCl$_4$ were added. The mixture was ball milled for another 24 h to give the pro-catalyst.

Example 52: 30 g MgCl$_2$, 5.25 g AlCl$_3$ and 0.95 g C-donor were ball milled (RBM) for 24 h, then 1.41 g (0.0131 mol) 2,6-Lutidine and 4.02 g TiCl$_4$ were added. The mixture was ball milled for another 24 h to give the pro-catalyst.

Example 53: 30 g MgCl$_2$, 5.25 g AlCl$_3$ and 1.43 g C-donor were ball milled (RBM) for 24 h, then 1.41 g (0.0131 mol) 2,6-Lutidine and 4.02 g TiCl$_4$ were added. The mixture was ball milled for another 24 h to give the pro-catalyst.

These pro-catalysts were used in catalysts for the polymerization of polypropylene to produce polymers having characteristics set forth in the Table below:

Example 54

Method for Preparation of a Preferred Catalyst 120 lbs. of solid magnesium chloride ("MgCl$_2$") and 21 lbs. of solid aluminum chloride ("AlCl$_3$") were charged to a 250 L vibratory ball mill and mixed for about 15 minutes. Then, 3.8 lbs. of cyclohexylmethyldimethoxysilane was sprayed into the stainless steel container. Alternatively, the silane could have been added with the other two components before ball milling. The mixture was then ball milled for 16 hours at room temperature.

Subsequent to the initial ball milling, 3.7 lbs. of liquid 2,6-lutidine and 16.1 lbs. of liquid titanium tetrachloride (TiCl$_4$) were added to the mixture. An alternative heterocyclic aromatic amine, such as about 4.5 lbs. of liquid 6-chloro-2-picoline could instead have been substituted. The lutidine was directly added to these components, although spray addition of the two liquid components into the existing mixture over about two to three hours would also be suitable. The five (5) components were then ball milled for about an additional 16 hours. The ball milling involves vibrating steel balls to pound the component particles, imparting heat to the ball milling vessel; however, the vessel was temperature controlled to maintain approximately room temperature during the ball milling.

In the preparation of a variety of FPO polymers, the productivity of the present catalyst has ranged from about a 30 to 55 percent increase, compared to conventional catalysts.

Examples 55–62

Pilot Plant Continuous Process

Polymers were prepared in a large scale continuous pilot plant operation, wherein monomers, hydrogen, and catalyst components were separately and continuously charged to a stirred reactor. The total monomer feed rate corresponded to about a 1.8 hour residence time in the reactor. Triethylaluminum ("TEA") and external modifier cyclohexylmethyldimethoxysilane ("CMDS") were pumped into the reactor

| Example No. | Ti % | C-donor (Si/Ti) | 2,6-Lutidine (N/Ti) | Polymn. Run No | C.E. g/g-cat·h | $\Delta H_f$ J/g | M.P. °C. | MFR g/10 min | MEK Sol % | $M_n$ ×10$^{-3}$ | $M_w$ ×10$^{-3}$ | PDI |
|---|---|---|---|---|---|---|---|---|---|---|---|---|
| 45 | 2.33 | 0 | 1.86 | 2540-1 | 6400 | 31.8 | 154.8 | 1.5 | 6.8 | 36 | 283 | 7.78 |
| 46 | 2.41 | 0 | 1.24 | 2540-71 | 8800 | 27.4 | 154.2 | 1.6 | 7.2 | 40 | 299 | 7.45 |
| 47 | 2.50 | 0 | 0.62 | 2540-75 | 12700 | 27.3 | 153.4 | 1.9 | 6.9 | 32 | 273 | 8.4 |
| 48 | 2.54 | 0 | 0.32 | 2540-82 | 15900 | 29.5 | 152.6 | 3.2 | 10.1 | 26 | 247 | 9.41 |
| 49 | 4.54 | 0 | 0.31 | 2540-80 | 12600 | 32.7 | 154.6 | 1.9 | 6.6 | 31 | 242 | 7.74 |
| 50 | 4.47 | 0.118 | 0.31 | 2540-89 | 15100 | 38.8 | 154.0 | 2.4 | 5.5 | 36 | 263 | 7.37 |
| 51 | 2.47 | 0.118 | 0.62 | 2541-6 | 14300 | 29.5 | 153.6 | 2.3 | 8.0 | | | |
| 52 | 2.44 | 0.23 | 0.62 | 2540-91 | 15500 | 28.3 | 152.9 | 1.6 | 8.0 | 32 | 274 | 8.48 |
| 53 | 2.41 | 0.35 | 0.62 | 2541-8 | 15000 | 37.1 | 153.5 | 1.8 | 5.9 | | | |

Examples 45–53 illustrate the optimization of donor dosage by locating a point where the MFR is sufficiently low, but catalyst productivity is acceptably high for polymerization, as well as the optimization of maintaining improved productivity while obtaining low heat of fusion. Example 52 appears as the pro-catalyst advantageously having the optimum recipe, with a relatively high productivity of 15,500 g/g catalyst, relatively low H$_f$ of about 28.3 J/g, and significantly lower MFR of about 1.6 g/10 min. than for other catalyst formulations.

as about 5 weight percent and 0.25 weight percent heptane solutions, respectively. The solid catalyst component had a titanium content of about 2.2 weight percent and was prepared according to Example 54. The solid catalyst component was pumped into the reactor as a 25 weight percent mixture in petrolatum. The catalyst components were added at rates directly proportional to the polymer production rates, and in amounts sufficient to maintain the polymer solids concentration in the reactor slurry at values typically in the range of about 30 to 50 weight percent. The catalyst productivity (lbs polymer/lb solid catalyst) was calculated from the polymer solids withdrawal rate and the solid catalyst component addition rate. The product polymers were separated from unreacted monomers, deactivated, stabilized, and pelletized, followed by testing to determine polymer characteristics. The Table below summarizes the pertinent operating conditions and results of the physical testing of the polymer characteristics. process described in the Examples above. Initially, a clean one-Liter stainless steel autoclave reactor equipped with an agitator was purged with nitrogen to remove impurities.

Examples 72–83

Preparation of Various Copolymers

Each of the polymer products in Examples 72 to 83 set forth in the Table below were prepared in general by the Next, triethylaluminum is added to the reactor in sufficient quantity to provide an Al:Ti atomic ratio of about 200:1 when followed by addition of a mineral oil suspension containing about 10 mg of solid procatalyst as described herein. The mixed monomer charges, which include 660 mL

| Example | 55 | 56 | 57 | 58 | 59 | 60 | 61 | 62 |
|---|---|---|---|---|---|---|---|---|
| Reactor Temp °F. | 135 | 135 | 135 | 135 | 135 | 135 | 140 | 140 |
| Propylene (lbs/hr) | 138 | 154 | 136 | 146 | 142 | 147 | 147 | 135 |
| Ethylene (lbs/hr) | — | — | 1.5 | 1.1 | — | — | — | — |
| Hydrogen (lbs/hr) | — | 0.028 | — | 0.028 | 0.026 | 0.040 | 0.027 | 0.04 |
| Solid catalyst (lbs/hr) | 0.0045 | 0.0038 | 0.0029 | 0.0026 | 0.0045 | 0.0048 | 0.0055 | 0.0046 |
| Al/Ti mol ratio | 162 | 210 | 256 | 364 | 155 | 184 | 161 | 191 |
| CMDS/Ti mol ratio | — | — | — | — | 0.77 | 0.87 | 2 | 2 |
| Productivity (lbs/hr) | 9880 | 11600 | 16110 | 16890 | 9630 | 10420 | 8480 | 10090 |
| Ethylene-wt % | — | — | 2.2 | 2.6 | — | — | — | — |
| $\Delta H_f$ (J/g) | 26.6 | 23.8 | 17.8 | 18.2 | 33.5 | 36.1 | 50.4 | 53.4 |
| MFR (g/10 min) | 4.6 | 13.6 | 4.9 | 15.8 | 7.4 | 30 | 4.8 | 25.9 |
| Tensile Modulus (kpsi) | 11 | 9 | 5 | 3 | 20 | 20 | 40 | 43 |
| Tensile stress @ 311% strain - psi | 1330 | 935 | 983 | 660 | 1400 | 1087 | 2100 | 1720 |
| % Tensile set, 0/24 hr | 36/23 | 34/19 | 31/17 | 30/17 | 46/31 | 45/29 | 63/45 | 69/50 |
| VICAT softening (° C.) | 58 | 46 | 41 | 42 | 66 | 57 | 95 | 97 |
| Shore D Hardness | 46 | 45 | 38 | 34 | 51 | 50 | 61 | 62 |

Examples 63–71

Preparation of Various Polymers

The polymerization of several polymers, which are by no means indicative of the broad scope of polymers this invention is meant to encompass, was examined using the ball-milled catalyst of the present invention. The characteristics of some of these polymers are set forth below:

liquid volume, were subsequently introduced into the reactor at an effective pressure and under thermal control to maintain a reaction temperature of 60° C. for one hour. The "C" and "D" donors were those used previously. After one hour, the unreacted monomer was vented off and the polymer product was recovered using conventional techniques. The characteristics of some of these polymer products are set forth below:

| Example No. | 63 | 64 | 65 | 66 | 67 | 68 | 69 | 70 | 71 |
|---|---|---|---|---|---|---|---|---|---|
| Pro-cat., mg | 10 | 10 | 10 | 10 | 10 | 10 | 10 | 10 | 10 |
| Co-catalyst | TEA | TEA | TEA | TEA | TEA | TEA | TEA | TEA | TEA |
| Al/Ti, mol/mol | 200 | 200 | 200 | 200 | 200 | 200 | 200 | 200 | 200 |
| Modifier | | CMDS | | CMDS | | | | | |
| Modifier/Ti, mol/mol | | 1 | | 1 | | | | | |
| $H_2$, psig | 0 | 0 | 5 | 5 | 0 | 0 | 0 | 0 | 0 |
| Ethylene, g/min[a] | 0 | 0 | 0 | 0 | 0.27 | 0 | 0 | 0 | 0 |
| Propylene, mL | 660 | 660 | 660 | 660 | 660 | 610 | 460 | 610 | 460 |
| 1-butene, mL | 0 | 0 | 0 | 0 | 0 | 200 | 0 | 0 | 0 |
| 1-pentene, mL | 0 | 0 | 0 | 0 | 0 | 0 | 0 | 200 | 0 |
| C.E. g/g cat/h | 15300 | 10400 | 17500 | 13100 | 19600 | 11000 | 10600 | 9400 | 8000 |
| H.F., J/g | 32.2 | 57.2 | 34.8 | 62.7 | 25.6 | 21.8 | 13.8 | 21.9 | 6.6 |
| m.p, ° C. | 153.7 | 156.4 | 155.9 | 158.3 | 146.7 | 137.3 | 109.7 | 141.0 | 126.9 |
| MFR, g/10 min | 2.16 | 0.3 | 12.0 | 21.9 | 2.24 | 4.1 | 6.3 | 4.4 | 10.2 |

Batch polymerization in 1 liter autoclave, 60° C., for 1 hr.
[a]Ethylene continuously fed during 1 hour reaction time.

| Example No. | 72 | 73 | 74 | 75 | 76 | 77 | 78 | 79 | 80 | 81 | 82 | 83 |
| --- | --- | --- | --- | --- | --- | --- | --- | --- | --- | --- | --- | --- |
| Propylene, mL | 640 | 610 | 560 | 460 | 640 | 610 | 560 | 460 | 640 | 610 | 560 | 460 |
| 1-butene, mL | 20 | 50 | 100 | 200 | 0 | 0 | 0 | 0 | 0 | 0 | 0 | 0 |
| 1-pentene, mL | 0 | 0 | 0 | 0 | 20 | 50 | 100 | 200 | 0 | 0 | 0 | 0 |
| 1-octene, mL | 0 | 0 | 0 | 0 | 0 | 0 | 0 | 0 | 20 | 50 | 100 | 200 |
| C.E. g/g-cat/h | 13200 | 11000 | 10600 | 10700 | 13000 | 10400 | 10300 | 8000 | 12600 | 12200 | 11000 | |
| wt % $C_{4-8}$[a] | 1.8 | 5.9 | 11.4 | 28.7 | 3.5 | 4.2 | 8.9 | 26.4 | 1.2 | 3.0 | 8.5 | 13.8 |
| $nc_3$[b] | 69.7 | 21.8 | 11.3 | 4.6 | 65.7 | 39.8 | 19.5 | 8.0 | 186.2 | 84.7 | 32.7 | 17.4 |
| H.F., J/g | 28.3 | 25.4 | 18.3 | 7.4 | 23.9 | 18.4 | 16.9 | 10.4 | 26.2 | 24.0 | 19.9 | 14.3 |
| m.p., °C. | 149.0 | 136.6 | 131.6 | 110.1 | 146.5 | 139.9 | 132.5 | 130.0 | 150.5 | 147.2 | 144.2 | 144.4 |
| $T_g$, °C. | −1.5 | −3.0 | −5.1 | −9.8 | −2.1 | −3.4 | −3.9 | −6.8 | −2.8 | −3.0 | −5.6 | |
| MFR, g/10 min | 3.2 | 4.0 | 2.8 | 6.6 | 3.8 | 5.0 | 6.8 | 10.2 | 2.9 | 3.8 | 5.3 | 8.9 |
| Density, g/cm³ | 0.873 | 0.865 | 0.869 | 0.864 | 0.871 | 0.868 | 0.866 | 0.856 | 0.87 | 0.874 | 0.866 | 0.863 |
| MEK sol % | 8.1 | 6.8 | 5.2 | 4.6 | 8.0 | 7.2 | 8.2 | 6.1 | 7.6 | 8.1 | 7.4 | 7.1 |

Batch polymerization in 1 liter autclave. Catalyst 10 mg; TEA/Ti 200; Total liquid monomer charge 660 mL; 60° C.; 1 hr.
[a]Weight percentage of co-monomer incorporation.
[b]Number average sequence length for propylene units.
[c]Number average sequence length for co-monomer units.

Examples 84–99

Ethylene Co-Monomer Polymers

The following examples illustrate various types of polymers produced according to the present invention by using ethylene and at least one other co-monomer as a monomeric raw material. These particular polymers used propylene as the other co-monomer in the monomeric raw material with ethylene.

| | HIGHER ETHYLENE FPO PRODUCTS | | | | | | | | | |
|---|---|---|---|---|---|---|---|---|---|---|
| EXAMPLE NO. | 84 | 85 | 86 | 87 | 88 | 89 | 90 | 91 | 92 | 93 |
| I.O.T Melt Flow, g/10 min @ 230° C. | 5.3 | 5 | 5.8 | 5.7 | 5.5 | 5.3 | 4.7 | 5 | 5.5 | 5.2 |
| Ethylene Content, wt % | 2.2 | 3.8 | 5.7 | 7.3 | 9.7 | 9.6 | 14.8 | 17.7 | 15 | 16.6 |
| DSC M$_p$/F$_p$(° C.) | 147.2/93.8 | 144.5/92.2 | 136.6/88.1 | 132.0/85.3 | 127.6/84.4 | 127.9/84.5 | 123.3/80.9 | 118.9/77.6 | 120.5/77.7 | 114.9/73.5 |
| Enthalpy (J/g) ($\Delta$H$_f$/$\Delta$H$_c$) | 17.5/21.6 | 14/−19.7 | 14.1/−13.1 | 11.5/−12.6 | 7.9/−10.6 | 8.1/−9.6 | 5.7/−7.7 | 4/−4.4 | 5.2/−6.8 | 4.5/−4.9 |
| Density, g/cm³ | — | — | 0.8683 | — | — | 0.8597 | — | 0.8446 | — | — |
| DSC Tg, ° C. | — | −6.7 | 9.3 | −16.2 | — | −17.7 | −24.1 | −26.1 | — | — |
| MEK Solubles, wt % | 9.03 | 9.42 | 7.89 | 7.67 | 7.07 | 6.77 | 6.8 | 7.2 | — | — |
| Diethyl Ether Sol., wt. | 31.5 | 35.9 | 41.5 | 45.2 | 47 | 45.5 | 48.2 | 47.4 | — | — |
| Hexane Sol. wt % | 39.5 | 45.6 | 51.8 | 62.6 | 70.5 | 68.6 | 77.3 | 81.6 | 80.6 | 82.3 |
| Shore Hardness, A/D scales | 377– | 337– | 28/85 | 25/81 | 20/75 | 20/76 | 15/67 | 12/61 | 15/66 | 12/62 |
| Shrinkage Test: | | | | | | | | | | |
| Length (in/in) | — | 0.0363 | — | — | — | 0.0669 | 0.0838 | — | — | |
| Width (in/in) | — | 0.0016 | — | — | — | −0.0078 | −0.0065 | — | — | |
| Molecular Weight Measures: | | | | | | | | | | |
| GPC Mn(x1000) | 27 | 26 | 27 | 27 | 27 | 27 | 27 | 28 | 32 | 27 |
| Mw(x1000) | 219 | 221 | 222 | 224 | 222 | 226 | 218 | 207 | 219 | 203 |
| Mz(x1000) | 792 | 836 | 873 | 889 | 905 | 916 | 968 | 850 | 857 | 821 |
| PDI | 8.1 | 8.5 | 8.22 | 8.3 | 8.22 | 8.4 | 8.1 | 7.4 | 6.8 | 7.5 |
| I.V. of neat polymer, dl/g | 1.48 | 1.96 | 1.24 | 1.63 | 1.25 | 1.67 | 1.37 | 1.23 | — | — |
| I.V. of ether soluble fraction, dl/g | 0.826 | 0.87 | 0.61 | 0.82 | 0.87 | 0.79 | 0.9 | 0.91 | — | — |
| Cast Film 1 mil by 6 inches: | 1.6–2.1 | — | 1.6–1.7 | — | — | 1.3 | — | 1.7–1.8 | — | — |
| Measured Thickness (mil) Machine Direction: | | | | | | | | | | |
| Stress @ Yield (psi) | 733 | — | NY | — | — | NY | — | — | — | — |
| Stress @ Break (psi) | 1761 | — | 1468 | — | — | 1052 | — | 870 | — | — |
| Strain @ Break (%) | 549 | — | 568 | — | — | 415 | — | 656 | — | — |

-continued

| EXAMPLE NO. | HIGHER ETHYLENE FPO PRODUCTS | | | | | | | | | |
|---|---|---|---|---|---|---|---|---|---|---|
| | 84 | 85 | 86 | 87 | 88 | 89 | 90 | 91 | 92 | 93 |
| Transverse Direction: | | | | | | | | | | |
| Stress @ Yield (psi) | 539 | — | 401 | — | — | NY | — | NY | — | — |
| Stress @ Break (psi) | NB(989) | — | NB(728) | — | — | NB(516) | — | NB(226) | — | — |
| Strain @ Break (%) | NB(>700) | — | NB(>700) | — | — | NB(>700) | — | NB(>700) | — | — |
| Tensile Modulus (kpsi) | 5.1 | 3.8 | 2.6 | 2.2 | 1.6 | 1.6 | 1.2 | 0.87 | 1.11 | 0.88 |
| Tensile Strain at Yield (%) | NY | NY | NY | NY | NY | NY | NY | NY | NY | NY |
| Tensile Strain at Yield (psi) | NY | NY | NY | NY | NY | NY | NY | NY | NY | NY |
| Tensile Strain at Break (%) | NB | NB | NB | NB | NB | NB | NB | NB | NB | NB |
| Tensile Strain at Break (psi) | NB | NB | NB | NB | NB | NB | NB | NB | NB | NB |
| Tensile Strain at Max. Stain (311%) (psi) | 936 | 844 | 699 | 626 | 550 | 547 | 359 | 270 | 354 | 291 |
| Tensile Set after 300% Extension (%) (0/24 h) | 31/16 | 30/17 | 30/15 | 29/15 | 29/13 | 29/13 | 35/13 | 38/13 | 36/14 | 36/13 |
| VICAT Softening Temperature (° C.) | 40 | 40 | 40 | 39 | 43 | 43 | 23 | 23 | 23 | 23 |
| Melt Swell Ratio (210° C./5 kg) | 1.502 | 1.52 | 1.55 | 1.566 | 1.524 | 1.536 | 1.486 | 1.49 | 1.498 | 1.46 |
| Zero-Shear Viscosity (Pa-s) | 9675 | 8823 | 8312 | 8796 | 8456 | 8624 | 8713 | 7945 | 7984 | 7740 |
| Crossover Modulus (Pa) | 22044 | 22277 | 22461 | 22800 | 24509 | 24638 | 29304 | 31881 | 29641 | 30252 |
| PDI = 100,000/Gc | 4.54 | 4.49 | 4.45 | 4.38 | 4.08 | 4.06 | 3.41 | 3.14 | 3.37 | 3.31 |
| Crossover Frequency, rad/s | 21.09 | 23.2 | 25.6 | 25.13 | 27.75 | 27.99 | 34.04 | 40.21 | 37.17 | 39.79 |

| HIGHER ETHYLENE FPO PRODUCTS WITH DONOR ADDED | | | | | | |
|---|---|---|---|---|---|---|
| EXAMPLE NO. | 94 | 95 | 96 | 97 | 98 | 99 |
| LOT Melt Flow, g/10 min. @ 230° C. | 5.5 | 8.4 | 4 | 4.8 | 5.6 | 6.9 |
| Ethylene Content, wt % | 9.7 | 6.2 | 14.7 | 12.6 | 9.8 | 9.8 |
| DSC $M_F/F_P$(° C.) ($\Delta H_F/\Delta H_c$) | 132.2/86.6 | 136.3/93.1 | 121.9/81.1 | 126/84.6 | 130.8/88.8 | 130.8/87.5 |
| Enthalpy (J/g) ($\Delta H_F/\Delta H_c$) | 27.3/−30.7 | 23/−24.7 | 14.6/−19.4 | 17.8/20.3 | 21/−18.9 | 29.4/−30.7 |
| Density, g/cm$^3$ | — | — | — | — | 0.874 | 0.878 |
| MEK Solubles, wt % | 4.96 | 6.31 | 3.4 | — | — | — |
| Diethyl Ether Sol., wt % | 23 | 27.7 | 29.5 | — | — | — |
| Shrinkage Test: | | | | | | |
| Length (in/in) | — | 0.0125 | 0.0181 | — | 0.0131 | 0.0125 |
| Width (in/in) | — | 0.0137 | 0.0143 | — | 0.0133 | 0.0136 |
| I.V. of neat polymer, dl/g | 1.9 | 1.3 | 1.65 | — | — | — |
| I.V. of ether soluble fraction, dl/g | 0.57 | 0.37 | 0.8 | — | — | — |
| Cast Film 1 mil by 6 inches: | 1.4–1.5 | 1.4–1.7 | 1.4–1.5 | — | — | — |
| Measured Thickness (mil) | | | | | | |
| Machine Direction | | | 711 | | | |
| Stress @ Yield (psi) | 1047 | 959 | 1356 | — | — | — |
| Stress @ Break (psi) | 2760 | 2043 | 552 | — | — | — |
| Strain @ Break (%) | 538 | 653 | — | — | — | — |
| Tranverse Direction | | | | | | |
| Stress @ Yield (psi) | 733 | 774 | 566 | — | — | — |
| Stress @ Braak (psi) | NB(1500) | NB(1510) | NB(1190) | — | — | — |
| Strain @ Break (%) | NB | NB | NB | — | — | — |

Although preferred embodiments of the invention have been described in the foregoing description, it will be understood that the invention is not limited to the specific embodiments disclosed herein but is capable of numerous modifications by one of ordinary skill in the art. It will be understood that the materials used and the chemical details may be slightly different or modified without departing from the methods and compositions disclosed and taught by the present invention.

What is claimed is:

1. A method of preparing predominantly amorphous polyolefin polymers comprising polymerizing an α-olefin monomeric raw material in the presence of a catalyst comprising:
   a pro-catalyst comprising:
      a magnesium halide,
      an aluminum halide,
      a tetravalent titanium halide,
      an electron donor; and
      a silane having the formula $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl; and
   a co-catalyst comprising an organometallic compound, or reaction products of the pro-catalyst and the co-catalyst, wherein the electron donor is present in an amount sufficient to reduce the stickiness of the resultant flexible polyolefin polymers, wherein the pro-catalyst is produced by first mixing a silane, a magnesium halide and an aluminum halide and then, subsequently, combining an electron donor and a titanium halide with the first mixture, and wherein the polyolefin polymers have a crystallinity from about 15 J/g to 60 J/g.

2. The method of claim 1, which further comprises selecting the monomeric raw material to be alpha-olefin monomers.

3. The method of claim 2, which further comprises selecting alpha-olefin monomers to be monomers of propylene, ethylene, butene, pentene, octene, or mixtures thereof.

4. The method of claim 2, which further comprises selecting the plurality of alpha-olefin monomers to be propylene and at least one additional monomer having between about 2 to 12 carbon atoms per molecule.

5. The method of claim 4, wherein the additional monomer is at least one of ethylene, 1-butene, 1-pentene or 1-octene.

6. The method of claim 3, which further comprises providing ethylene in the monomeric raw material in an amount of about 1 to 40 weight percent.

7. The method of claim 6, which further comprises providing ethylene in the monomeric raw material in an amount of about 1 to 20 weight percent.

8. The method of claim 1, which further comprises adding hydrogen to the polymerization in an amount of less than about 10 weight percent.

9. The method of claim 1, which further comprises selecting the organometallic compound to be a metal alkane.

10. The method of claim 9, which further comprises selecting the organometallic compound to be an aluminum alkane.

11. The method of claim 1, which further comprises adding external modifier to the catalyst in an amount sufficient to increase the crystallinity of the polyolefin polymers to a desired level of between about 4.6 J/g to 35 J/g.

12. The method of claim 1, which further comprises adding external modifier to the catalyst in an amount sufficient to increase the crystallinity of the polyolefin polymers to a desired level of between about 15 J/g to 60 J/g.

13. The method of claim 12, which further comprises selecting the external modifier to be a silane component, selecting the desired level of crystallinity to be about 25 J/g to 55 J/g, and selecting the polyolefin polymer to have a melt flow rate of between about 0.3 to 30 g/10 min. at 230° C.

14. The method of claim 12, wherein ethylene is provided in an effective amount to preclude substantial modification by the external modifier of at least one physical property of the polymer.

15. The method of claim 14, wherein the physical property is selected to include crystallinity of propylene domains in the polymer.

16. The method of claim 13, which further comprises selecting the melt flow rate of the polyolefin polymer to be between about 0.4 g/10 min. to 60 g/10 min.

17. The method of claim 16, which further comprises selecting the melt flow rate of the polyolefin polymer to be between about 0.4 g/10 min. to 15 g/10 min.

18. The method of claim 1, which further comprises reducing the stickiness to a sufficiently low level so that only between about 1 to 12 weight percent of the polyolefin polymer is soluble in methylethyl ketone.

19. The method of claim 18, which further comprises reducing the stickiness to a sufficiently low level so that only between about 1 to 5 weight percent of the polyolefin polymer is soluble in methylethyl ketone.

20. The method of claim 1, which further comprises selecting the sufficient polymerization conditions to include a feed of monomers having at least about 70 weight percent propylene, a temperature of about 130° F. to 175° F., and a reactor pressure sufficient to maintain the propylene in a liquid phase.

21. The method of claim 1, which further comprises selecting the silane to have $R_1$ as a $C_{5-12}$cycloalkyl, $R_2$ as $C_{1-6}$alkyl, and $R_3$ and $R_4$ each as a $C_{1-6}$alkyl.

22. The method of claim 21, which further comprises selecting the silane to have $R_1$ as cyclohexyl, and $R_2$, $R_3$ and $R_4$ each as methyl.

23. The method of claim 12, which further comprises selecting the external modifier to be a silane having the formula $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl.

24. A method of preparing predominantly amorphous polyolefin polymers which comprises:

preparing a pro-catalyst by mixing a magnesium halide, an aluminum halide, and a silane having the formula $R_1R_2Si(OR_3)(OR_4)$ to form a first mixture, and, subsequently adding an electron donor, and a tetravalent titanium halide to the first mixture, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are each an H, $C_{1-6}$alkyl, or a mono- or di-substituted $C_{1-6}$alkyl;

adding a co-catalyst comprising an organometallic compound to the pro-catalyst to prepare a catalyst;

contacting a monomeric raw material and the catalyst under conditions sufficient to cause polymerization of the raw material to produce a predominantly amorphous polymerization product containing polyolefin polymers, wherein the catalyst reduces the stickiness of the resultant polyolefin polymers; and recovering polyolefin polymers having a crystallinity from about 15 J/g to 60 J/g from the polymerization product.

25. A method of preparing predominantly amorphous polyolefin polymers comprising polymerizing an α-olefin monomeric raw material in the presence of a catalyst comprising:

a pro-catalyst comprising:
a magnesium halide,
an aluminum halide,
a tetravalent titanium halide,
an electron donor comprising at least one of 2,6-lutidine, 2,6-dichloropyridine, or 6-chloro-2-picoline; and
a silane having the formula $R_1R_2Si(OR_3)(OR_4)$, wherein $R_1$ and $R_2$ are each an H, $C_{1-6}$alkyl, aryl, $C_{5-12}$cycloalkyl, each of which may be unsubstituted, mono- or di-substituted, and $R_3$ and $R_4$ are H, $C_{1-6}$alkyl, or a mono- or di-substituted $C_{1-6}$alkyl; and a co-catalyst comprising an organometallic compound, or reaction products of the pro-catalyst and the co-catalyst, wherein the electron donor is present in an amount sufficient to reduce the stickiness of the resultant flexible polyolefin polymers, wherein the pro-catalyst is produced by first mixing a silane, a magnesium halide and an aluminum halide and then, subsequently, combining an electron donor and a titanium halide with the first mixture, and wherein the polyolefin polymers have a crystallinity from about 15 J/g to 60 J/g.

* * * * *